United States Patent
Martinez et al.

(10) Patent No.: US 8,868,072 B2
(45) Date of Patent: Oct. 21, 2014

(54) METHOD AND SYSTEM FOR FACILITATING COMMUNICATION BETWEEN WIRELESS COMMUNICATION DEVICES

(75) Inventors: Rogelio Martinez, Madrid (ES); Phillip Carter, Berkshire (GB); Oscar Gallego Gomez, Berkshire (GB); Alfonso Gomez, Madrid (ES); Jonathon Marchant, Berkshire (GB)

(73) Assignee: Vodafone IP Licensing Limited, Berkshire (GB)

( * ) Notice: Subject to any disclaimer, the term of this patent is extended or adjusted under 35 U.S.C. 154(b) by 0 days.

(21) Appl. No.: 13/370,463

(22) Filed: Feb. 10, 2012

(65) Prior Publication Data

US 2012/0225652 A1     Sep. 6, 2012

(30) Foreign Application Priority Data

Feb. 11, 2011   (GB) ................................. 1102464.3
Feb. 15, 2011   (GB) ................................. 1102627.5

(51) Int. Cl.
- *H04W 4/00* (2009.01)
- *H04L 29/08* (2006.01)
- *H04M 3/42* (2006.01)
- *H04L 29/06* (2006.01)
- *H04W 76/02* (2009.01)

(52) U.S. Cl.
CPC ........... *H04M 3/42374* (2013.01); *H04L 67/24* (2013.01); *H04L 65/1073* (2013.01); *H04W 76/022* (2013.01); *H04L 65/1016* (2013.01); *H04L 65/1006* (2013.01)
USPC ........ 455/435.1; 455/420; 455/421; 455/436; 455/550.1; 455/552.1; 370/328; 370/331; 370/332

(58) Field of Classification Search
USPC ............. 455/422.1, 432.2, 435.1–435.3, 436, 455/448, 456.3, 552.1, 550.1, 556.1; 370/352, 355, 310.2, 328, 331, 338, 370/353, 356
See application file for complete search history.

(56) References Cited

U.S. PATENT DOCUMENTS

| | | | |
|---|---|---|---|
| 2003/0040316 A1 * | 2/2003 | Stanforth et al. | 455/445 |
| 2005/0036446 A1 | 2/2005 | Jang et al. | 370/229 |

(Continued)

FOREIGN PATENT DOCUMENTS

| | | |
|---|---|---|
| EP | 1 940 105 | 7/2008 |
| WO | WO 2005/064958 A1 | 7/2005 |

(Continued)

OTHER PUBLICATIONS

European Search Report dated Jul. 27, 2012.
(Continued)

*Primary Examiner* — Babar Sarwar
(74) *Attorney, Agent, or Firm* — Kratz, Quintos & Hanson, LLP

(57) ABSTRACT

There is provided a method in a first communications device operable to communicate with a second device using a network supporting first and second different communication methods. The method comprises: allowing the first device to communicate with the second device using the first communication method; registering the first device on a service platform of the network; requesting from the service platform a second device status indicator of the ability of the second device to communicate using the second communication method; receiving the second device status indicator from the service platform; and, allowing the first device to communicate with the second device using the second communication method in dependence on the received second device status indicator. The second device status indicator depends on the current network connectivity of the second device. At least one of the first and second devices is a mobile telecommunications device.

29 Claims, 27 Drawing Sheets

(56) References Cited

U.S. PATENT DOCUMENTS

| | | | | |
|---|---|---|---|---|
| 2006/0256779 | A1* | 11/2006 | Lim et al. | 370/352 |
| 2007/0165599 | A1* | 7/2007 | Skog et al. | 370/352 |
| 2008/0317010 | A1* | 12/2008 | Naqvi et al. | 370/355 |
| 2009/0300115 | A1 | 12/2009 | Postmus | 709/205 |

FOREIGN PATENT DOCUMENTS

| | | |
|---|---|---|
| WO | 2006/052176 | 5/2006 |
| WO | 2006/121272 | 11/2006 |
| WO | 2006/137646 | 12/2006 |

OTHER PUBLICATIONS

European Search Report issued Jul. 18, 2012 in counterpart application (2 pages).
Search Report issued Mar. 31, 2011 from the Intellectual Property Office of Great Britian in counterpart application (2 pages.)
J. Rosenberg et al.: Indicating User Agent Capabilities in the Session Initiation Protocol (SIP), The Internet Society, Aug. 2004, pp. 1-36.
Wikipedia: "Video Share", retrieved from the Internet on Apr. 30, 2011, http://en.wikipedia.org/wiki/Video_share, last modified Oct. 25, 2010 (8 pages).

* cited by examiner

METHOD AND SYSTEM FOR FACILITATING COMMUNICATION BETWEEN WIRELESS COMMUNICATION DEVICES

BACKGROUND OF THE INVENTION

Rich Communications Suite (RCS) Release 1 was first published in December 2008. RCS was defined by the GSMA, an association of telecommunications operators and related companies, with the aim of producing an umbrella of advanced communication services prioritising the interoperability of the services across network operators and handset manufacturers. RCS Release 1 established the main services and components to be used as part of RCS such as enhanced address books and chat, for example, instant messaging. RCS Release 2 was published in June 2009 and expanded Release 1 to cover Broadband Access (BA) devices such as PCs connected over Wi-Fi in addition to the mobile telecommunications devices supported by Release 1. Release 3, in addition to other enhancements, included functionality that advanced communication services, such as video, did not require a voice call to be initiated prior to the initiation of the advanced communication services, whereas this had been the case in previous releases.

As mentioned above, RCS defines advanced communication services for adoption. It defines the profiles and implementation for adoption of existing standardised services as defined by various standardisation bodies, such as the 3rd Generation Partnership Project (3GPP), Open Mobile Alliance (OMA) or Internet Engineering Task Force (IETF). The communication services defined by RCS include chat, file transfer, image share and video share (one-way and two-way). Other functionality defined in RCS includes enhanced address book (EAB), including service capability and social presence, network address book (NAB), including remote back up and restore and enhanced messaging, including message history.

As part of the EAB, RCS includes facilities for social presence. Social presence is a status indicator that displays the availability of a person to communicate. It can vary from the simplistic such as red-amber-green coloured indications, to the complex such as the Session Initiation Protocol for Instant Messaging and Presence Leverage Extensions (SIMPLE) and the Extensible Messaging and Presence Protocol (XMPP) both of which are defined standards and are widely adopted. Social presence is indicated by the user and often cached at a network level for others to easily identify the presence status indicated by the user. Social presence is not autonomous but requires publication of the social status by the user client.

Many of the standardised communications services adopted by RCS have been in existence for a considerable amount of time, some being implemented in a variety of ways by different operators and manufacturers. One example of this is two-way video sharing or video calling which has been commonplace in telecommunications since the widespread usage of 3G handsets.

Despite widespread availability, video calling has not been adopted by the average consumer. One suggested reason for the consumer's apparent lack of interest in the technology is the inconsistency of service and the user's confidence in potential service completion. A user will typically initiate a video call hoping that the contact is online, has good connectivity for a high quality call, is available to transmit video and has video capable hardware.

Video calling has a high average data transfer rate and thus requires good connectivity for high quality of service. Additionally, there are currently a small number of handset models and therefore contacts which are equipped for video calling. There is no currently available method to establish, prior to call initiation, the potential probability of successful call completion and call quality.

Although the above has been described in terms of video calling, it is clear that the problems apply to any communication service that requires a certain level of network connectivity and capability. The user has no idea whether the recipient has a device capable of communicating using the service and whether or not the device has sufficient network quality to receive the service.

Some attempts have been made to address this problem. For example, WO2006/052176 describes a mobile telephone communications system in which, during an ongoing call over a circuit-switched network between first and second terminals, when a terminal detects that packet-switched communication has become possible, for example due to moving location, corresponding capability messages are exchanged between the terminals and the possibility of using multimedia services are then indicated to the terminal user. In a similar manner, WO2006/121272 describes an in-call change in the state of first user equipment causing the transfer of a communications list to a second user equipment. WO2006/137646 and US2008/0317010 describe other similar examples.

Modern video services such as Google Talk™ and Apple FaceTime® offer video calling and other advanced communication services on mobile devices. These services require registration and so are not available to any contact on a mobile device and are closed services, i.e. they are not interoperable with other handsets produced by other manufacturers. These services provide minimal online/offline indications along with a modicum of social presence information. A user of the service faces the same issues as those occurring with 3G video calling where the systems are not able to identify, nor guarantee, quality of service.

In summary, in known advanced communication services, the user must assume the communication is viable and is only made aware that this is not the case upon communication failure. This is an ongoing and significant barrier to the use of advanced communication services. The present invention is aimed at addressing this and its related problems.

SUMMARY OF THE INVENTION

According to a first aspect of the present invention there is provided a method for facilitating communication between a first communications device operable to communicate with a second device using a network supporting first and second different communication methods, comprising: allowing the first device to communicate with the second device using the first communication method; registering the first device on a service platform of the network; requesting from the service platform a second device status indicator of the ability of the second device to communicate using the second communication method; receiving the second device status indicator from the service platform; and, allowing the first device to communicate with the second device using the second communication method in dependence on the received second device status indicator. Preferably the second device status indicator depends on at least one of (i) the current network connectivity of the second device or (ii) communication method capability of the second device; or (ii) manually input user status information; or (iv) automatically generated user status information; or (v) device hardware functionality; or (vi) device software functionality; or (vii) communication method quality of service. At least one of the first and second devices will usually be a mobile telecommunications device.

In typical communications systems, there is a certain amount of guesswork required on the part of the user when initiating communications. For example, is the contact's device turned on or do they have a 3G connection, has the device user switched to a mode that they are not receiving calls or communications of a certain type (e.g. disabled video call capability for cost or privacy reasons—either through manual input or automatically set dependent on certain parameters (such as diary status, location, time of day))? The network connectivity of the device will have a direct impact on the potential quality of the communication service. The network connectivity is a factor which is related to the quality of service. Different coverage types (2G, 3G, HSPA, LTE for example) provide different impacts to different services. For example the latency in 3G compared to LTE may not allow certain services, despite the bandwidth being there. There is currently no indication of the connection capabilities of the target device. In the present invention, an a priori indication of service completion is provided to the user, i.e. the communication method is allowed in dependence on the network connectivity, thus significantly improving the user experience.

A user interacting with the device is thus provided with reassurance as to the potential success of communication. The futility of attempting to contact a device using an advanced form of communication such as video, only to find that the connection is impossible or unusable due to low bandwidth, can be frustrating to the user. In contrast, the user is able, with the present invention, to attempt communication with confidence knowing that the service will have a higher probability of connection success and connection/service quality. Advantageously, there is no sharing of private data for the probability of success to be indicated. The communication method is allowed in dependence on network connectivity and thus, access to social presence information, which the user may wish to keep private, is not required.

The method may also further comprise determining a first device status indicator of the ability of the first device to communicate using the second communication method based on the current network connectivity of the first device; and, allowing the first device to attempt to communicate with the second device using the second communication method in dependence on the first device status indicator.

In this way user experience is significantly improved. There is a confidence given to the user based on the potential service quality. Although the destination device may have adequate network connectivity, the local device must have adequate connectivity as well to ensure the service quality is high and the user experience is maintained.

The requesting step may further comprise forwarding the first device status indicator to the service platform for forwarding to the second device to update its capability information for the first device or for caching on the service platform.

The step of allowing the first device to communicate with the second device using the second communication method in dependence on the received second device status indicator may include displaying communication options for the second device to a user of the first device in accordance with the received second device status indicator, thus further improving the user experience of the device.

Before the step of requesting a second device status indicator, the method may also comprise displaying the first communication method as a selectable option to the user and not displaying the second communication method as a selectable option, such that, when selected, the device initiates communication with the second device using the first communication method. The user is therefore presented with only those communication options which will have a high probability of success. Those risky communications which are dependent on good network connectivity are not presented to the user before the network connectivity is checked.

If the first device cannot be registered on the service platform, the method may comprise displaying the first communication method as a selectable option to the user and not displaying the second communication method as a selectable option, such that, when selected, the device initiates communication with the second device using the first communication method. Therefore, in a similar manner to the above, those risky communications which are dependent on good network connectivity are not presented to the user before the network connectivity can be checked, thus ensuring a good user experience.

If the second device is not capable of using the second communication method, the method may also comprise displaying the first communication method as a selectable option to the user and not displaying the second communication method as a selectable option, such that, when selected, the device initiates communication with the second device using the first communication method. As above, the user is therefore presented with only those communication options which will have a high probability of success and those risky communications which are dependent on good network connectivity are not presented to the user before the network connectivity is checked.

The first or second or both status indicators may depend on one or more criteria selected from a group comprising quality of service, device hardware functionality, device software functionality (for example software capabilities/codecs), terminal hardware status and network operator provisioning status. The method may also thus provide an adaptive framework for the deployment of new services by network operators. The user experience for these new services is enhanced and the user is provided with knowledge, prior to initiating the communication, that the service will be successful. The Network Operator may provision the services on the devices as required for effective deployment. Additionally, communication services are not attempted where the target device is not capable of processing the communication method.

Further, because the status indicators may depend on terminal hardware status, factors such as battery life and file storage may be used to determine if the communication service may be used. For example, a file transfer may not be attempted if the recipient device does not have space to store the file. Thus, the user experience is significantly improved.

Additionally, the method may also comprise attempting to communicate with the second device using the second communication method prior to the step of requesting the second device status indicator. The probability of success of the communication method is checked before the method is fully initiated. The user can therefore be forewarned of a poor quality connection or inadequate functionality before the connection is completed.

Further, the step of requesting the second device status indicator may be performed when a user of the first device selects the user of the second device from a display of users on the first device. Thus, as part of the overall user experience, the user capabilities of the second device are discovered when needed, i.e. when the contact is selected. This ensures that the capabilities are up to date and the confidence the user can have in any potential connection is high. Preferably, the capabilities are not cached (caching would be potentially inaccurate), but are discovered upon selection to improve the accuracy.

In addition, or alternatively, the step of requesting the second device status indicator may be performed periodically according to a predetermined frequency to ensure that the capabilities of those contacts which are not selected or contacted often are relatively up-to-date.

The second communication method may have a higher required average data transfer rate than the first communication method. The second method can therefore be allowed to be used by the device if the network connectivity of the second device is good enough to handle the connection. The first method is allowed to be used regardless of the network connectivity as it has a lower required average data transfer rate.

The first communication method may be initiated prior to the requesting step. Thus the combination of communication methods may be allowed where connectivity is adequate. An example of this is in video sharing over a voice call, where the voice call is initiated first and the second device checked to see if it is capable of sharing video and allowed to do so if it is.

In addition, the method may also comprise detecting a change in network connectivity of the first device, wherein the requesting step is performed when there is a change detected in network connectivity of the first device. In this way, it is ensured that the capabilities are up to date thereby improving the user experience.

The method may further comprise: receiving a request from the service platform to provide a first device status indicator of the ability of the first device to communicate using the second communication method, the request including a second device status indicator of the ability of the second device to communicate using the second communication method; determining the first device status indicator based on the current network connectivity of the first device; forwarding the first device status indicator to the service platform; and, allowing the first device to communicate with the second device using the second communication method in dependence on the first and second device status indicators, wherein the second device status indicator depends on the current network connectivity of the second device. Thus the second device can be provided with the status of the first device to provide similar facilities to those available to first device, i.e. that the communication method is allowed depending on the status indicators.

Within modern communication networks, it is becoming increasingly important to ensure network operability to enable end to end communication. For example a personal computer connected to the internet via an Ethernet cable and ADSL connection, can now expect to make contact—via appropriate software—with a wireless mobile phone. This is effected by the wireless network being connected to the internet via an appropriate network gateway. For the purpose of the invention, a network therefore anticipates and includes a plurality of different but interconnected communication networks which are each capable of supporting both the first and second different communication methods, wherein the first and second devices may be able to communicate with the service platform via different communication networks (e.g. a mobile phone will communicate via the mobile telecommunications network, whilst a personal computer may communicate with the service platform via a conventional internet connection). Preferably the second device status indicator depends on at least one of (i) the current network connectivity of the second device or (ii) communication method capability of the second device; or (iii) manually input user status information; or (iv) automatically generated user status information; or (v) device hardware functionality; or (vi) device software functionality; or (vii) communication method quality of service. At least one of the first and second devices will usually be a mobile telecommunications device.

According to a second aspect of the present invention, there is provided a method of operating a network having a service platform, the network supporting first and second different communication methods, the method comprising: receiving a request to register a first device on the service platform; registering the first device on the service platform; and, receiving a request from the first device to provide a second device status indicator of the ability of a second device to communicate using the second communication method, wherein at least one of the first and second devices is a mobile telecommunications device; and, wherein, if the second device is registered on the service platform, then: routing the request to the second device; receiving the second device status indicator from the second device; and, routing the received second device status indicator to the first device, wherein, if the second device is not registered on the service platform, then: providing a negative second device status indicator to the first device. Typically, the second device status indicator depends on the current network connectivity of the second device.

The method may also further comprise: registering the second device on a service platform of the network; determining the second device status indicator based on the current network connectivity of the second device; and, forwarding the second device status indicator to the service platform.

According to a third aspect of the present invention, there is provided a first communications device operable to communicate with a second device using a network supporting first and second different communication methods, the first device being adapted to: allow the first device to communicate with the second device using the first communication method; register the first device on a service platform of the network; request from the service platform a second device status indicator of the ability of the second device to communicate using the second communication method; receive the second device status indicator from the service platform; and, allow the first device to communicate with the second device using the second communication method in dependence on the received second device status indicator. Again, the second device status indicator typically depends on the current network connectivity of the second device. Usually, at least one of the first and second devices is a mobile telecommunications device.

According to a fourth aspect of the present invention, there is provided a service platform of a network, the network supporting first and second different communication methods, the service platform being adapted to: receive a request to register a first device on the service platform; register the first device on the service platform; and, receive a request from the first device to provide a second device status indicator of the ability of a second device to communicate using the second communication method, wherein, if the second device is registered on the service platform, the service platform is adapted to: route the request to the second device; receive the second device status indicator from the second device; and, route the received second device status indicator to the first device, wherein, if the second device is not registered on the service platform, the service platform is adapted to provide a negative second device status indicator to the first device. Typically, the second device status indicator depends on the current network connectivity of the second device. Usually, at least one of the first and second devices is a mobile telecommunications device.

According to a further aspect of the present invention, there is provided a system for facilitating communications between two devices comprising: a first device according to the third aspect of the present invention; a network entity according to the fourth aspect of the present invention; and, a second device being adapted to: register the second device on a service platform of the network; receive a request from the service platform to provide a second device status indicator of the ability of the second device to communicate using the second communication method; determine the second device status indicator, preferably based on the current network connectivity of the second device; and, forward the second device status indicator to the service platform. Additionally, at least part of the network may be wireless.

According to a further aspect of the present invention there is provided a communications system comprising communication network supporting first and second different communication methods and a first device operable to communicate with a second device using such network, the system being adapted to allow the first device to communicate with the second device using the first communication method, register the first device on a service platform of the network, request from the service platform a second device status indicator of the ability of the second device to communicate using the second communication method, receive the second device status indicator from the service platform; and allow the first device to communicate with the second device using the second communication method in dependence on the received second device status indicator.

According to another aspect of the present invention, there is provided a computer program product or group of products adapted to carry out the steps of the first or second aspects of the present invention.

DETAILED DESCRIPTION OF THE DRAWINGS

Some examples of the present invention will now be described in detail with reference to the accompanying drawings, in which.

DETAILED DESCRIPTION

We will now describe exemplary implementations of the invention; however, in order to understand the invention in context we firstly discuss the underlying technology which is used to implement these examples.

The following abbreviations will be used throughout the present description:
3GPP 3rd Generation Partnership Project;
BA Broadband Access;
EAB Enhanced Address Book;
GPRS General Packet Radio Service;
HSPA High Speed Packet Access;
HSPA+ Evolved High Speed Packet Access;
IETF Internet Engineering Task Force;
IMS IP Multimedia Sub-system;
IP Internet Protocol;
LTE Long Term Evolution;
MSISDN Mobile Subscriber Integrated Services Digital Network Number;
MSRP Message Session Relay Protocol;
NAB Network Address Book;
OMA Open Mobile Alliance;
QoS Quality of Service;
RCS Rich Communication Suite;
RFC Request for Comments;
RLS Resource List Service;
RTP Real-Time Transfer Protocol;
SIMPLE Session Initiation Protocol for Instant Messaging and Presence Leverage Extensions;
SIP Session Initiation Protocol;
UI User Interface;
XDMS XML Data Management Server;
XML Extensible Mark-up Language; and,
XMPP Extensible Messaging and Presence Protocol;

Rich Communications Suite (RCS) defines inter-operable communications services to be adopted by network operators and mobile handset manufacturers. RCS adopts various existing standards and defines how they should be implemented. It uses the known IP Multimedia Sub-system (IMS) to provide the framework for these services. IMS is an architectural framework for delivering internet protocol (IP) multimedia services. One of the key components of IMS is the Internet Engineering Task Force (IETF) protocol Session Initiation Protocol (SIP) which is used to control multimedia communications sessions over IP.

Figure 1:
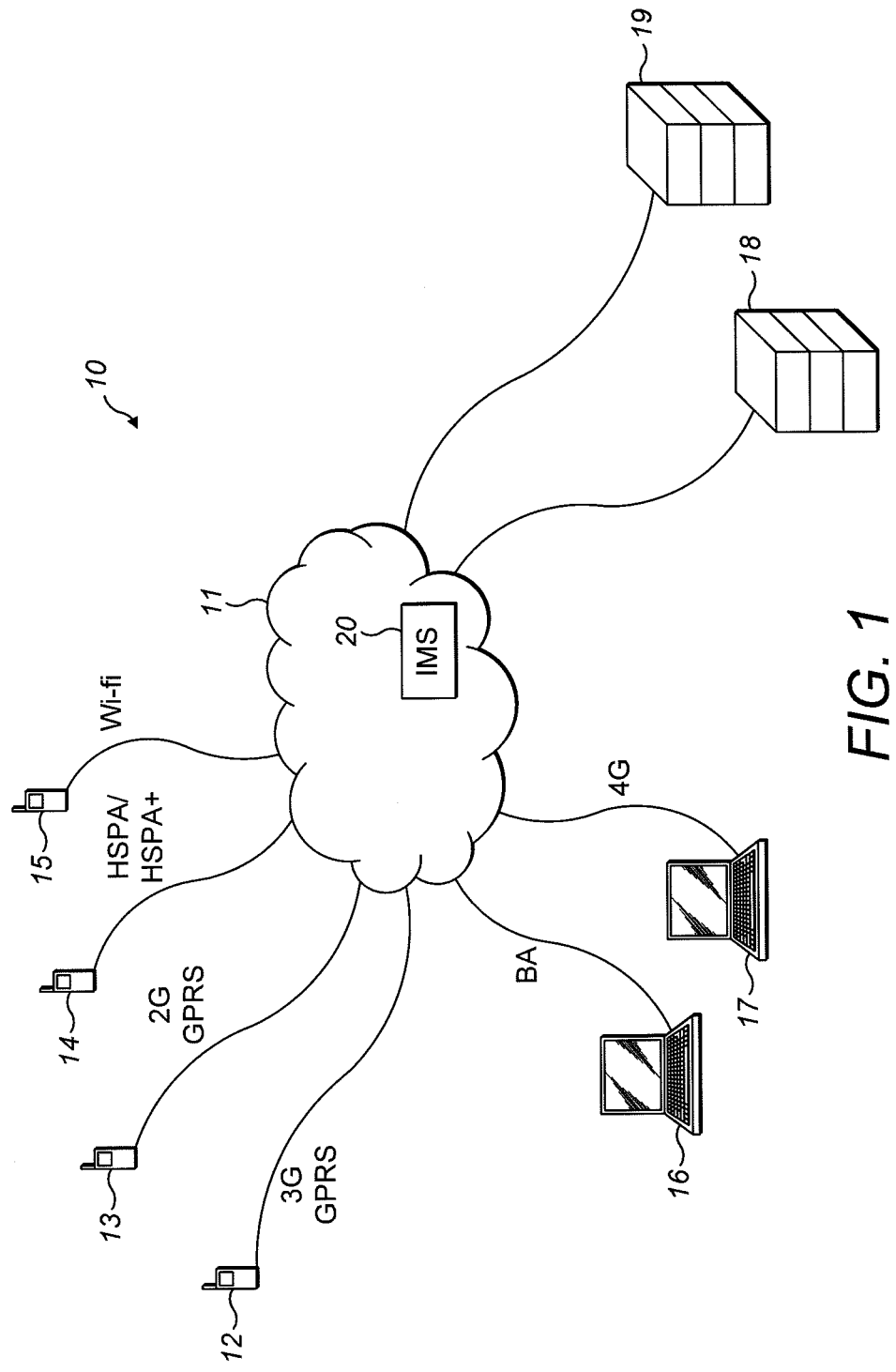
FIG. 1 shows a schematic representation of a system for implementing the invention.

FIG. 1 shows, schematically, an exemplary RCS system 10. A plurality of devices 12, 13, 14, 15, 16 and 17 may be connected to a network operator's core network via a variety of connection methods. These may include 2G GPRS, 3G GPRS, HSPA/HSPA+, Wi-Fi, Broadband Access (BA) or 4G for example Wi-Max or LTE. The devices may include any device suitable for IP communications such as a mobile telephone, smart phone, personal digital assistant, laptop equipped with a data card or laptop or PC connected over BA or Wi-Fi.

In communication with the core network 11 of the network operator is the IP Multimedia Sub-System (IMS) 20. The IMS provides a form of Fixed-Mobile Convergence (FMC) which aids the communication of multimedia and voice applications from wireless to fixed terminals. Additionally, in communication with the network 11 there may be multiple servers such as presence 18 or instant messaging servers 19 which provide facilities and storage for those services.

As mentioned above, RCS and IMS use the SIP protocol in order to control the multimedia communications sessions over IP defined in the suite. SIP is a text-based protocol where each transaction consists of a client request, that invokes a particular method or function on the server, and a response. Each SIP request has a method which defines its nature such as INVITE or OPTIONS. Each response contains a code combined with further information; these codes define the success or failure of the request.

Once the sessions have been initiated, other protocols may be used to facilitate communication, such as the message session relay protocol (MSRP) or Relay Transfer Protocol (RTP). MSRP is typically used in RCS for instant messaging, file transfer and image sharing while RTP is used for video sharing. Although it is described herein that these protocols and services may be used in the exemplary embodiments of the present invention, it should be understood that any suitable protocols may be utilised to realise the disclosed concepts of the present invention.

In the RCS specification, the SIP request and response model is used for a variety of functions. An example of this is the SIP PUBLISH method which is used to make public the device capabilities of the client handset. For example, the device will use the SIP PUBLISH method to send to a server (in RCS this is the presence server) that the device is an RCS capable device and which services the device is suitable for. This device information would then be stored for it to be retrieved subsequently from the server by another device using a SIP SUBSCRIBE method. The SIP SUBSCRIBE method may be anonymous and would return the RCS capabilities, i.e. the terminal hardware, of the device in question.

In the RCS specification there is no consideration of the availability of the client for communication other than the social presence method which is defined as part of the suite. RCS uses the session initiation protocol for instant messaging and presence leveraging extensions (SIMPLE) to define the social presence implementation. Social presence is widespread among instant messaging applications and provides a key addition to user interactions. There is no consideration, however, of the network connectivity or autonomous availability of the client other than the social presence which is published by the user.

SIMPLE uses the SIP request PUBLISH (RFC 3903) to allow users to inform the presence server of their current status. Common status messages may include "out to lunch", "busy", "away", and "online". A client may subscribe to receive presence updates from the presence server for a particular contact. When the social presence is uploaded to the presence server, the message may be pushed to the client device. The social updates are initiated by the user of the client device and are not autonomous.

When the device publishes the social presence information to the presence server, the presence server uses the SIP response '200 OK' to acknowledge receipt. The presence server then pushes the social presence to those subscribed watchers using the SIP request NOTIFY. The response from the watcher will then return '200 OK' as a response. Free text social presence status is possible using the SIMPLE framework where the PUBLISH request can incorporate the user's desired status message.

The Extensible Messaging and Presence Protocol (XMPP) is an alternative communications protocol incorporating social presence information. As with SIMPLE, the XMPP protocol requires the social presence to be published by the user. This is the key to social presence, where the flexibility of the user experience is important. Social presence includes no indication of the state of the device or its connectivity but rather includes an indication of the availability of the user operating the device and their status.

With social presence, communication attempts are not inhibited but the social presence is merely an indication of the status of the user. It may be the case that, although the user has indicated their presence as being "away", they may still wish to selectively communicate. The SIP PUBLISH/NOTIFY model requires that the user be subscribed to the user to receive the notifications. In addition, many of the social presence messages may be private to the user and their contacts.

Social presence is a component of the RCS enhanced address book (EAB), another feature of which is capability information. Typically, contacts in the address book may be identified as to whether they are using RCS compatible device. The RCS capabilities include which services the device is capable of using, for example the device may have a front facing camera and is therefore capable of video calling. This information is stored on the presence server along with presence information. Service capabilities are published using the SIP PUBLISH method in a similar manner to social presence publication. As with social presence, these capabilities are forwarded to subscribed users. If the user has purchased an RCS capable device, the capabilities will be published in the presence server and pushed to subscribed contacts.

Additionally, within RCS, when a voice call is set up, the devices may exchange capabilities. Capabilities are exchanged using a SIP OPTIONS query and corresponding response. An RCS capable recipient will receive and respond to the options query. The response will include the communication options the device is capable of. This options exchange only occurs during a voice call and does not affect the capabilities shown in the EAB which are based on the SIP PUBLISH/NOTIFY model.

If, during a voice call, the user wishes to share some content, the SIP INVITE request is used which is forwarded to all capable clients in the conversation. If the user accepts the invitation, a '200 OK' response is sent. A '603' response is forwarded if the invitation is rejected. In this system, there is no indication of the potential success of the communication based on the network connectivity of the recipient. The SIP OPTIONS exchange may be used to update the device's capability of sharing the content during a call. For example, if the device has a front facing camera, the device may be capable of video calling, but if they are connected on a low data rate connection, the quality will be very poor. In the RCS publications, there is only provided an indication of social presence and the device capabilities using SIP PUBLISH or SIP OPTIONS during a call. There is no indication of network presence, i.e. the network connectivity, and therefore the potential service completion success or quality.

Exemplary implementations of the present invention will now be described.

In an embodiment, the user may select a capable contact from his/her address book. When this happens, the device may perform an instant service capability check when displaying the available services. This may be implemented using SIP OPTIONS. As described above, SIP OPTIONS is a peer-to-peer request routed by the network to the client device that will generate one of two types of response. First, if the contact is registered for service then the contact service capabilities at this point in time will be returned. These are then received and logged by the client. Second, if the user is either not registered or not found, a message indicating as much will be returned by the IMS 20. This mechanism allows the client to determine what services are available before the call is made. SIP OPTIONS may be used to initially discover (and/or periodically check) the service capabilities of all the contacts of the address book when the user registers for service, regardless of how many exist.

The capabilities returned in response to an OPTIONS request represent the list of services that the client can access at a certain point of time. There may be a number of factors that affect the device capabilities. Firstly, the capability may depend on the user's network operator provisioning status. The network operator may choose to limit the service to customers depending on their payment status. For example, the user may be allowed to chat or file share but be restricted from using video. Secondly, the hardware of the terminal may affect the capability to use the service. For example, the hardware may have no capability of processing video and no front facing camera, but may be able to receive file transfers. Thirdly, the status of the terminal may affect its capability. For example, the terminal may not be able to receive files if its storage is full or it may not be able to use advanced communication if the device has a low battery where intensive processing may drain it. Furthermore the software capabilities and mutual software compatibility between the devices may affect the device capabilities. Finally, certain services may require a certain level of network quality of service. For example, streaming video over a 2G GPRS signal does not provide the adequate user experience.

Quality of service (QoS) consists of control mechanisms for performance, reliability and usability of telecommunications. The metrics used in assessing QoS may be, among others, audio quality, accessibility and coverage. These indicators may be used to assess the potential success of a communications services. For example, a low QoS may affect network communications having a high average data rate. A good level of QoS may be required for particular applications.

An exemplary summary of service requirements for advance communication methods is as follows. Chat may be available on all connections, file transfer (if the recipient has space to store the file) may not be suitable over 2G GPRS where the transfer would be very slow for the user but may be allowed over faster connections. Similarly, image sharing may not be suitable over 2G GPRS where the user experience may be poor. In a further example, video sharing may be one way only over 3G GPRS but may be simultaneously sent and received on faster connections.

Advantageously, a low battery level may prevent some or all of the services. In the described implementation, video and image sharing takes place only once an active voice call has been established. This voice call must not be a multi-party call, must not go on hold or waiting and equally forward or divert must not be in place. In the described embodiment, chat is always available as this requires no fast connection. It is contemplated this may not always be the case and the described embodiments should be understood as exemplary.

The OPTIONS request and response model requires that the capability exchange is reciprocal. It will be understood that this is not required; the capability exchange may be one way only. In the described implementation, the exchange is reciprocal and the device's capabilities may be different and the services made available to the user accordingly. Although the client device may support video encoding and the recipient may support decoding and thus it may be assumed that video sharing should be possible, both devices would need a sufficient connection for the connection to be allowed by the devices.

Figure 2:
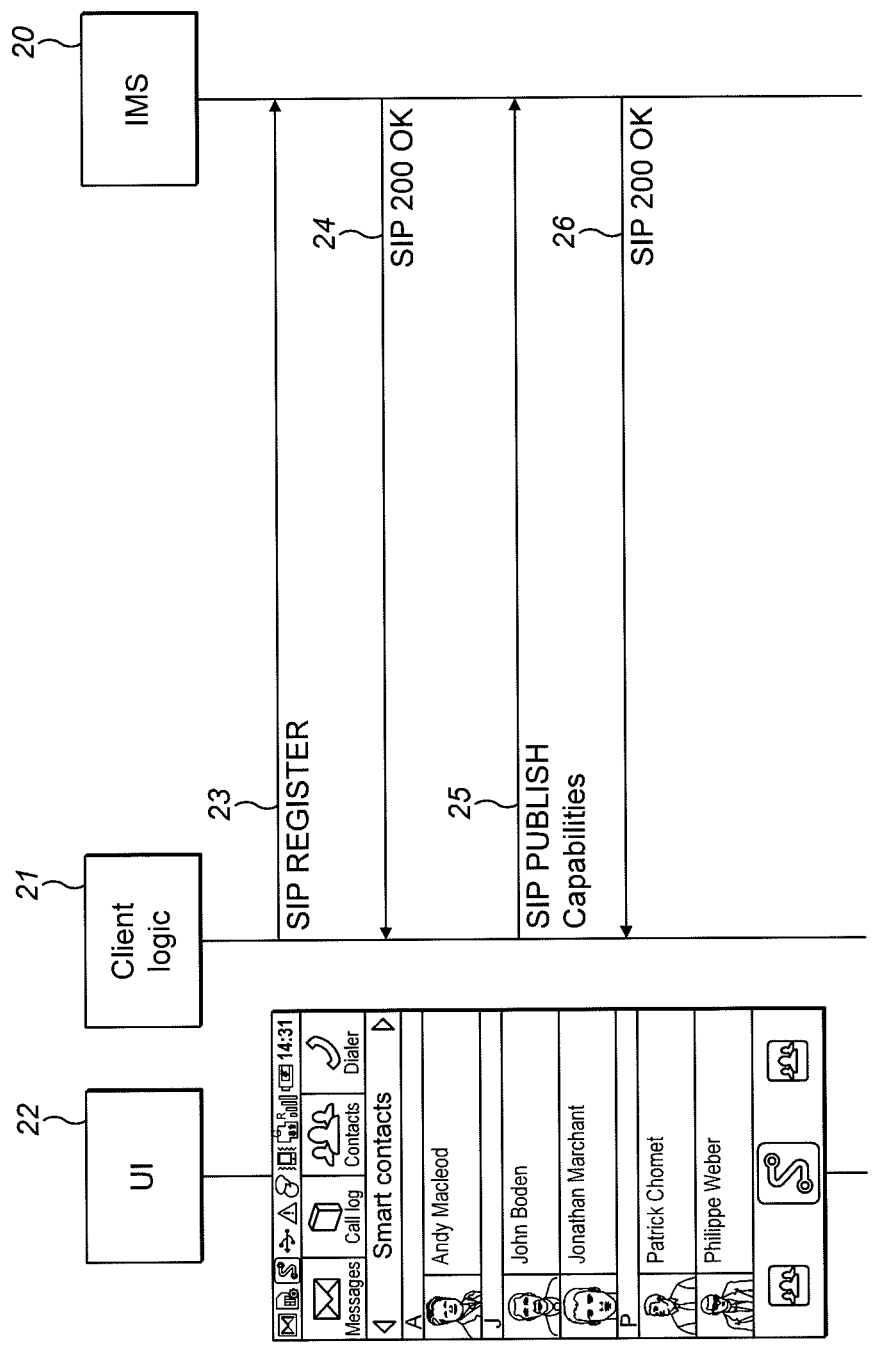
FIG. 2 shows a sequence diagram of handset start-up.

If it is enabled by configuration, when the handset starts up, the process shown in FIG. 2 may be performed. The handset is registered on the IMS core 20 when the handset is turned on and may be maintained until the handset powers down. First, a SIP REGISTER request is sent to the IMS 20 (step 23) from the client device 21. As shown in step 24, the response is a SIP '200 OK' response.

Authorisation may be the responsibility of the network and is not based on a challenge and user ID/password response from the client's device, although this is also contemplated. When the REGISTER has been acknowledged by the IMS 20, the client device 21 will PUBLISH its capabilities for storage at the IMS 20 (step 25) and the IMS 20 then returns an OK response when they are received (step 26). The capabilities may be stored on a presence server.

If, for example, the client device is powering down, its battery is low, it faces an imminent loss of coverage or has a change of data bearer or change of IP configuration, the client device may wish to de-register from the IMS 20. This may be done using a SIP REGISTER request method with a relevant message which would be acknowledged by the IMS 20 using a SIP '200 OK' message.

It is envisaged that, as part of the user interface 22, a list should be generated and maintained by the client of registered and non-registered contacts. This system may be used, for example, when the user wishes to share an image from the media gallery in a file transfer. Once the photo is selected, a list of contacts shall be displayed to the user in order to choose the target contact for the file transfer. This list, instead of having all the contacts in the address book shall contain only the capable discovered contacts (i.e. the ones that would support file transfer). Once a contact is selected from the aforementioned list, the OPTIONS exchange takes place to update the capabilities and verify the transfer can take place at that point in time, this will be discussed in more detail below.

Figure 3:
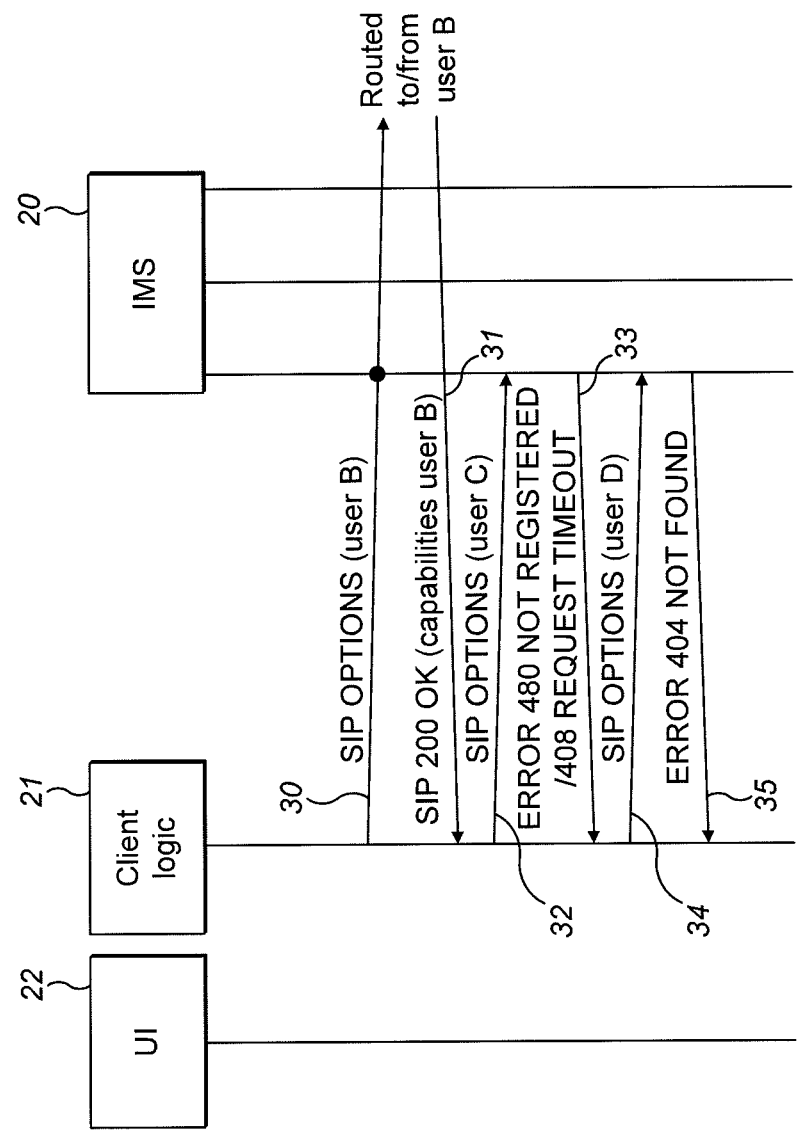
FIG. 3 shows a sequence diagram of capability discovery.

Once the user has been registered with the IMS of the network, the capabilities of a user of the contact list may be discovered. One contemplated method is using the SIM OPTIONS model. Alternatively, the presence discovery method may be used. The OPTIONS discovery mechanism is shown in FIG. 3. At step 30, the OPTIONS request is sent from client A through the IMS core network to user B. In this scenario we are assuming user B is registered, user C is not registered and user D is not a capable user. User B returns a SIP 200 OK message including its capabilities in response to the OPTIONS message from the client device (step 31). The client then sends a SIP OPTIONS message to user C (step 32). Error message 480 is returned by the IMS 20 either entitled 'not registered' or 'request time out' (step 33). If user B is currently not registered (e.g. the phone is off, out of coverage or roaming with data services disabled), then the network would respond with either the message 480 'not registered' (graceful un-registration took place) or 'request time out' (step 33). These messages signify that the user is a capable user but is not currently registered with the IMS 20. The client then sends a SIP OPTIONS message to the IMS 20 intended for user D (step 34). The IMS 20 returns an error 404 'not found' message (step 35). This message signifies that the user is a non-capable user, it has not been provisioned for these rich communication services and that the IMS 20 has no knowledge of the user. Users B, C and D need not be registered at the time the SIP OPTIONS query is performed by the client device to determine whether or not they are provisioned for use with the services as the IMS 20 retains knowledge of their details, returning a response that they are not currently registered but are provisioned for service, i.e. message 480.

Figure 4A:
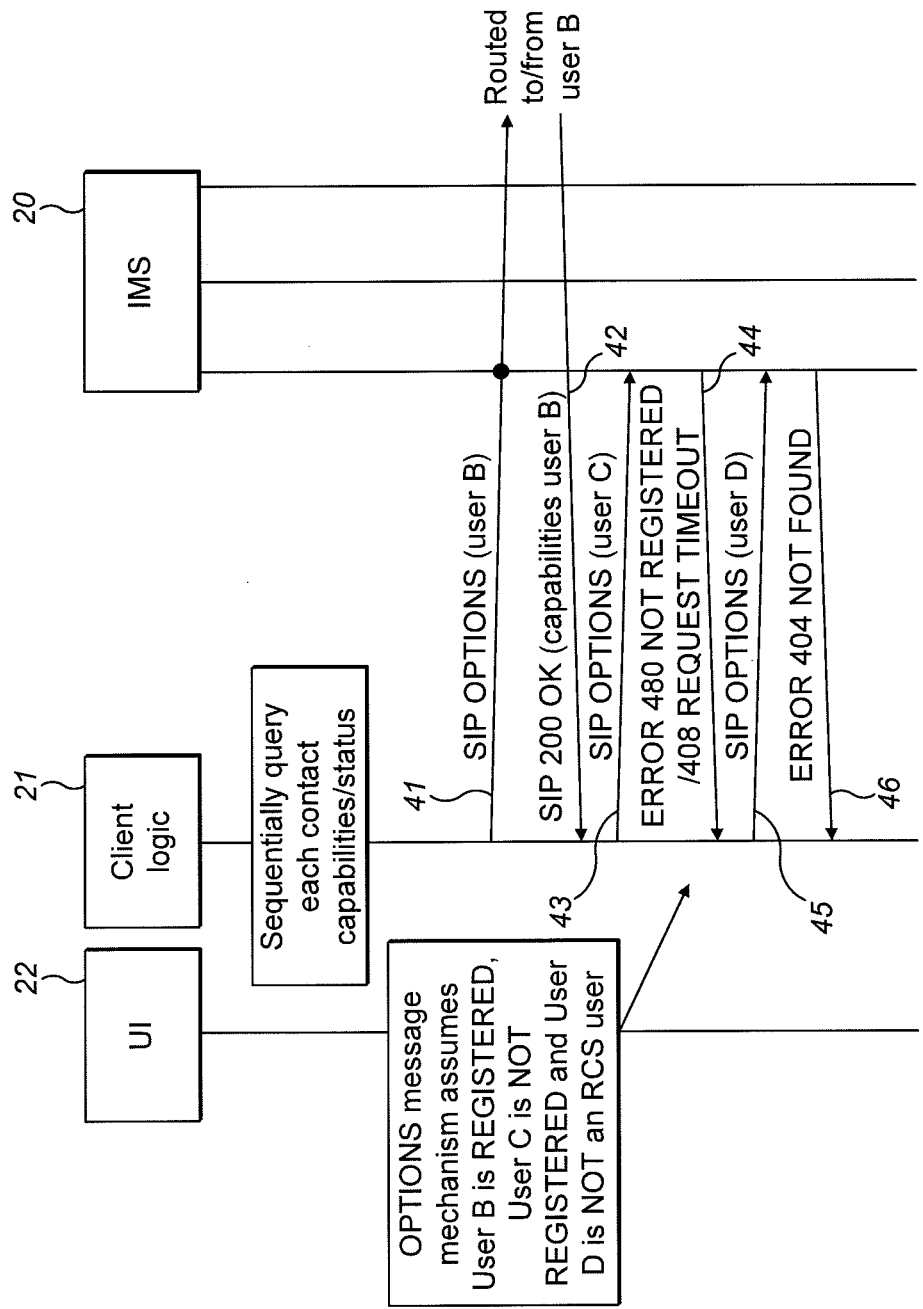
FIG. 4A shows a sequence diagram of capability status polling using SIP OPTIONS.
Figure 5A:
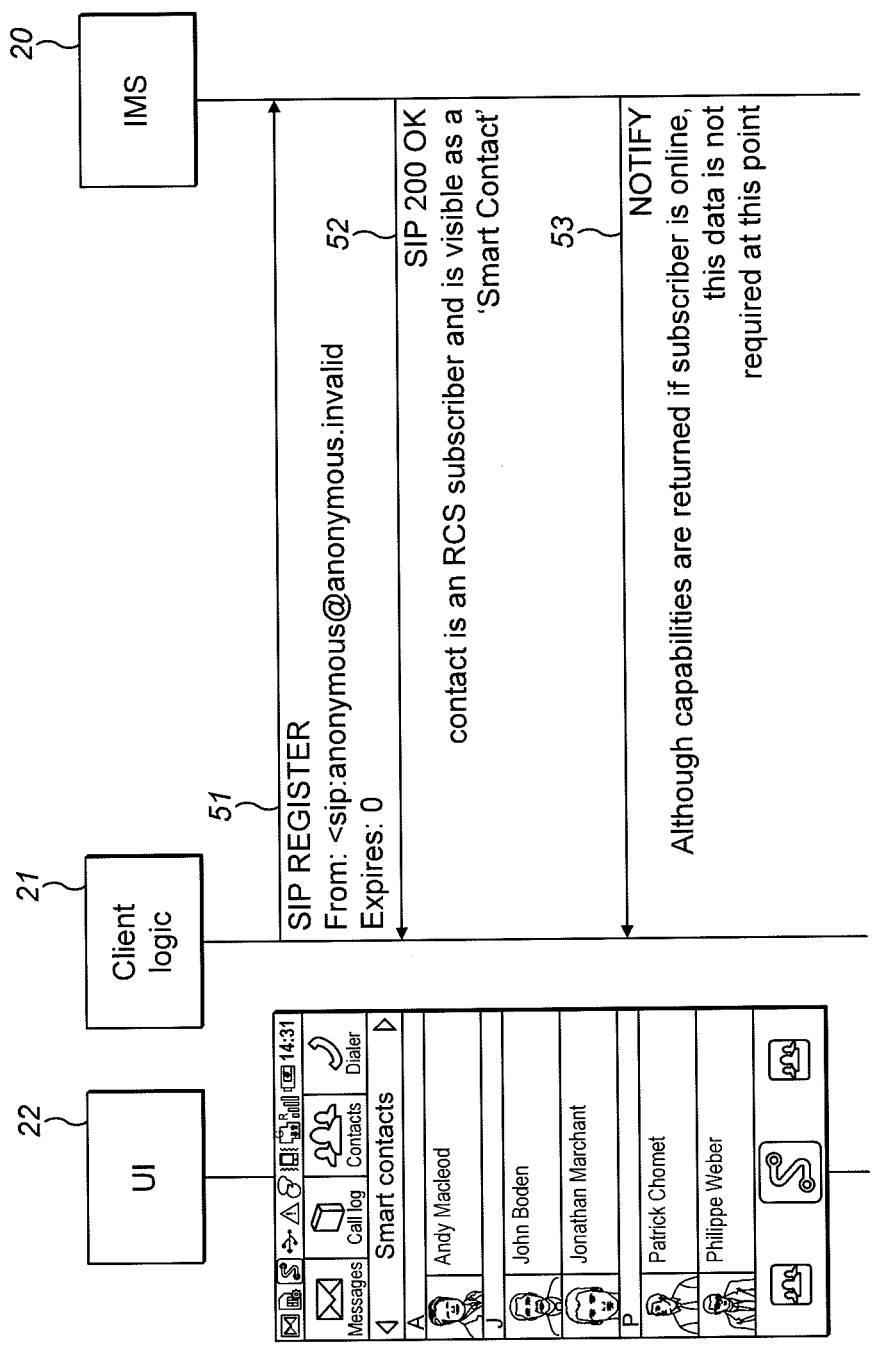
FIG. 5A shows a sequence diagram of contact addition using presence where the contact is RCS capable.
Figure 5B:
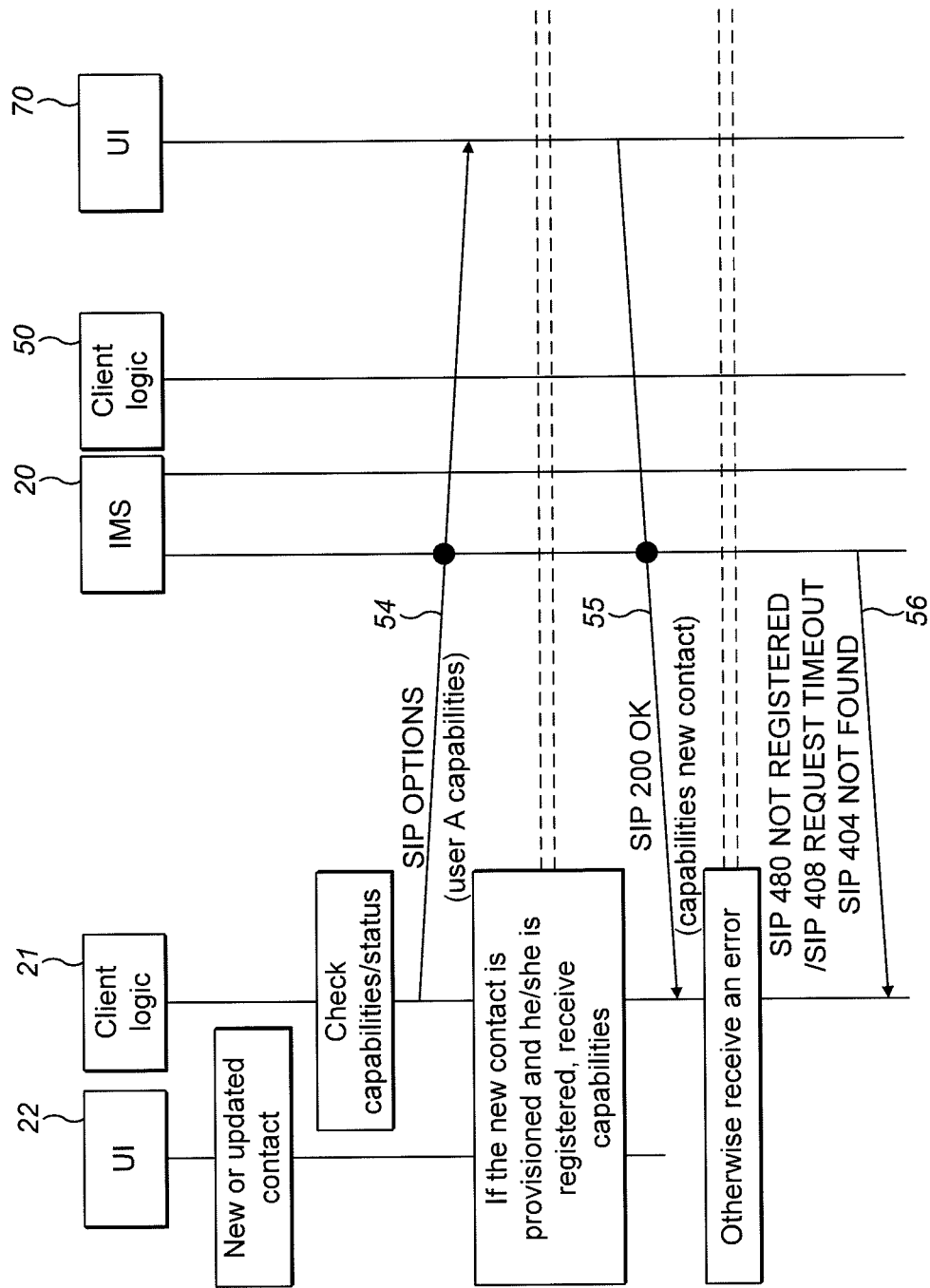
FIG. 5B shows a sequence diagram of contact addition using SIP OPTIONS where the contact is RCS capable.
Figure 8:
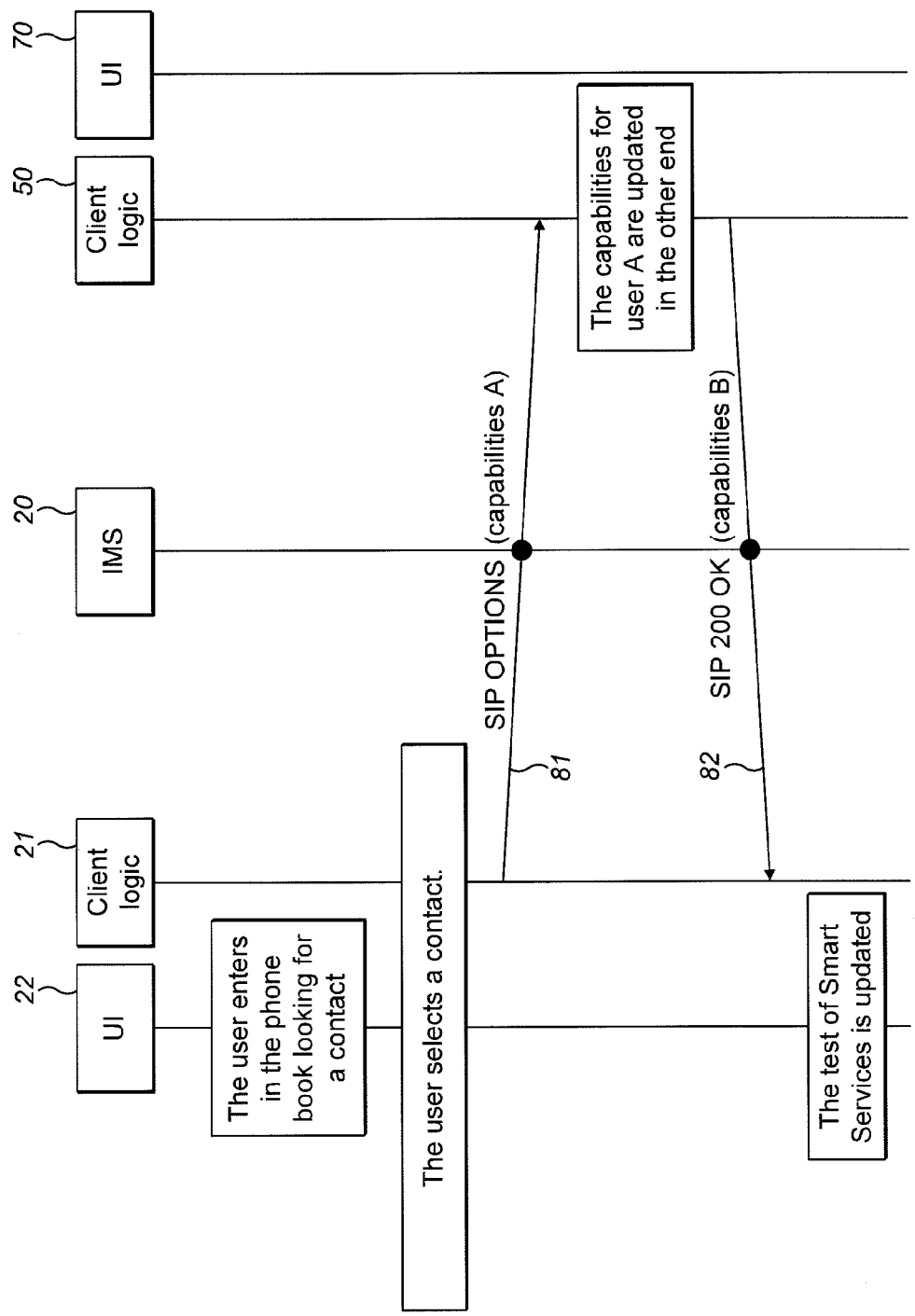
FIG. 8 shows a sequence diagram of contact selection where the contact is RCS capable.
Figure 9:
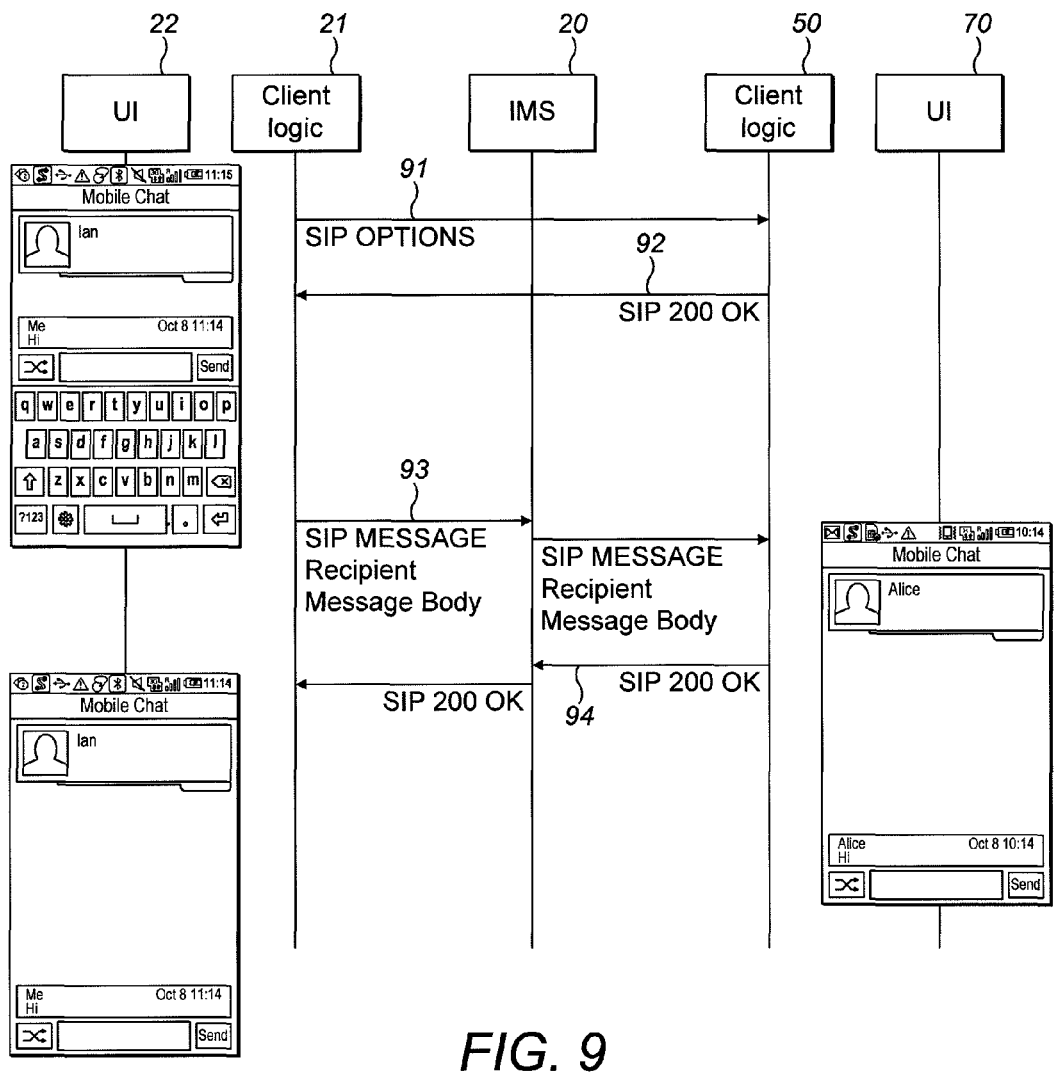
FIG. 9 shows a sequence diagram of initiating a chat session.
Figure 21:
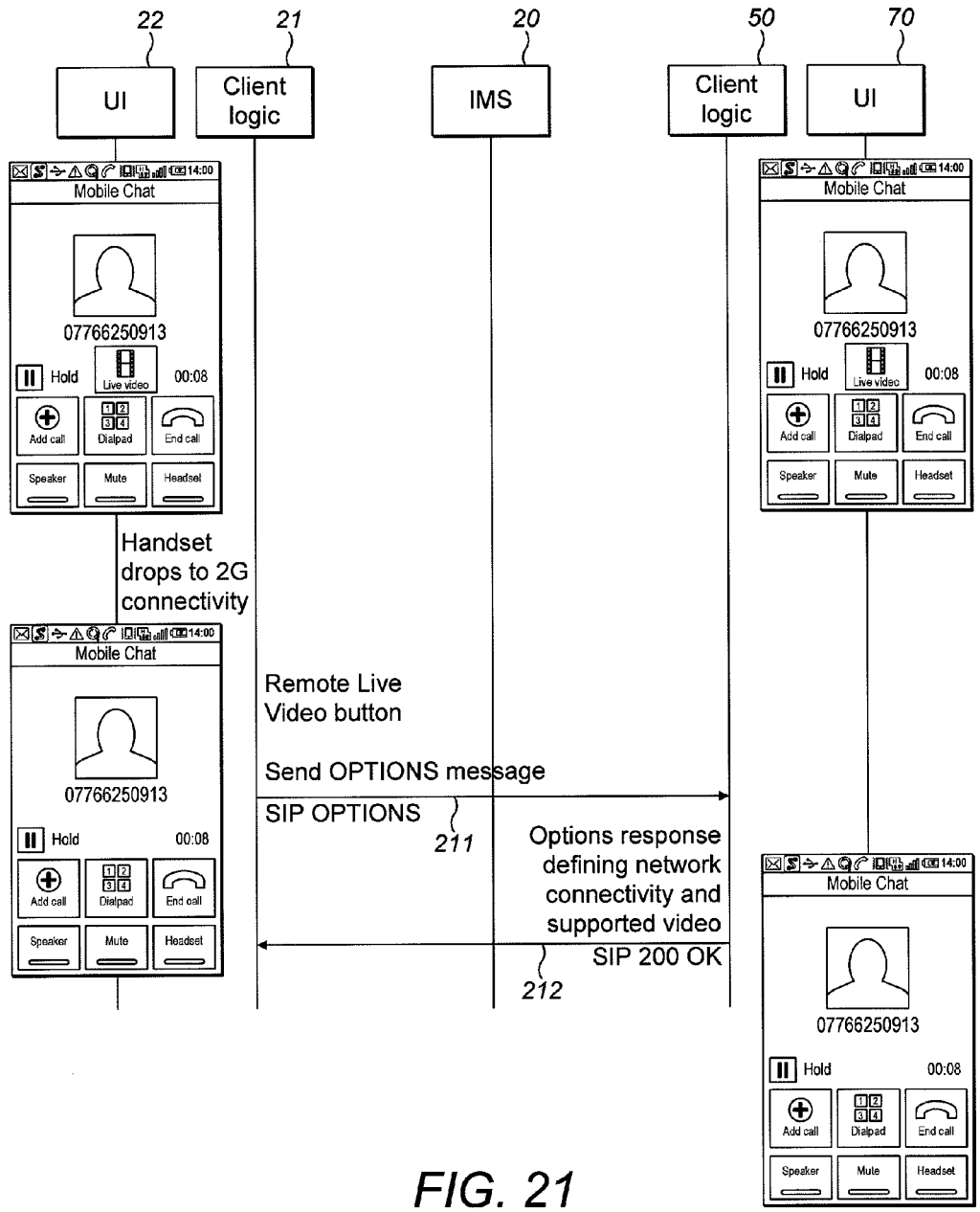
FIG. 21 shows a sequence diagram where the handset connection has dropped from 3G to 2G during video sharing.

The SIP OPTIONS exchange messages may be sent in the following scenarios:

post-first time registration to obtain the default set of capabilities as shown in FIG. 3;

when a new contact is added to the phone address book as shown in FIG. 5B;

periodically, with the frequency determined by a predetermined parameter to ensure that the capabilities are up-to-date where the users are not contacted frequently, as shown in FIG. 4A;

where MSISDNs are modified or added (where users have several subscriptions and each subscription is potentially associated with a capable account);

when checking the available capabilities of communication with another user as shown in FIG. 8;

at the beginning of a voice call or other communication session to obtain real time capabilities, as shown in FIG. 9;

during a voice call when the capabilities change, as shown in FIG. 21; and, whenever there is a communications event with another user in the address book where there is a valid MSISDN (the user is likely to be on-line and capabilities may be easily updated).

Alternatively, the presence system may be used as a discovery mechanism. In this mechanism, the contact list is collated and a SIP ANONYMOUS SUBSCRIBE request is sent to the IMS and acknowledged. A SIP NOTIFY message is sent back to the client from the IMS core including the capabilities per registered user as an aggregated response. No reference will be made to any users that are not capable of communicating via the services.

Although it is described that the IMS may aggregate the NOTIFY response, this may be a network configuration option and the NOTIFY may in fact consist of several individual responses corresponding to each contact.

Once the user has been registered on the IMS system, it may be desirable to discover the capabilities of the contacts in the address book periodically. The capabilities of users may be polled according to a predetermined parameter indicating the frequency. The mechanism for doing so is shown in FIGS. 4A and B. FIG. 4A shows the method of polling the devices using the SIP OPTIONS model. The OPTIONS message mechanism is used to sequentially query each contact's capabilities and status in a similar manner to the method that may occur when the user is first registered with the IMS. The client sends an options message to each user in turn (steps 41, 43 and 45) and the responses (steps 42, 44 and 46) indicate the capabilities of the devices.

Figure 4B:
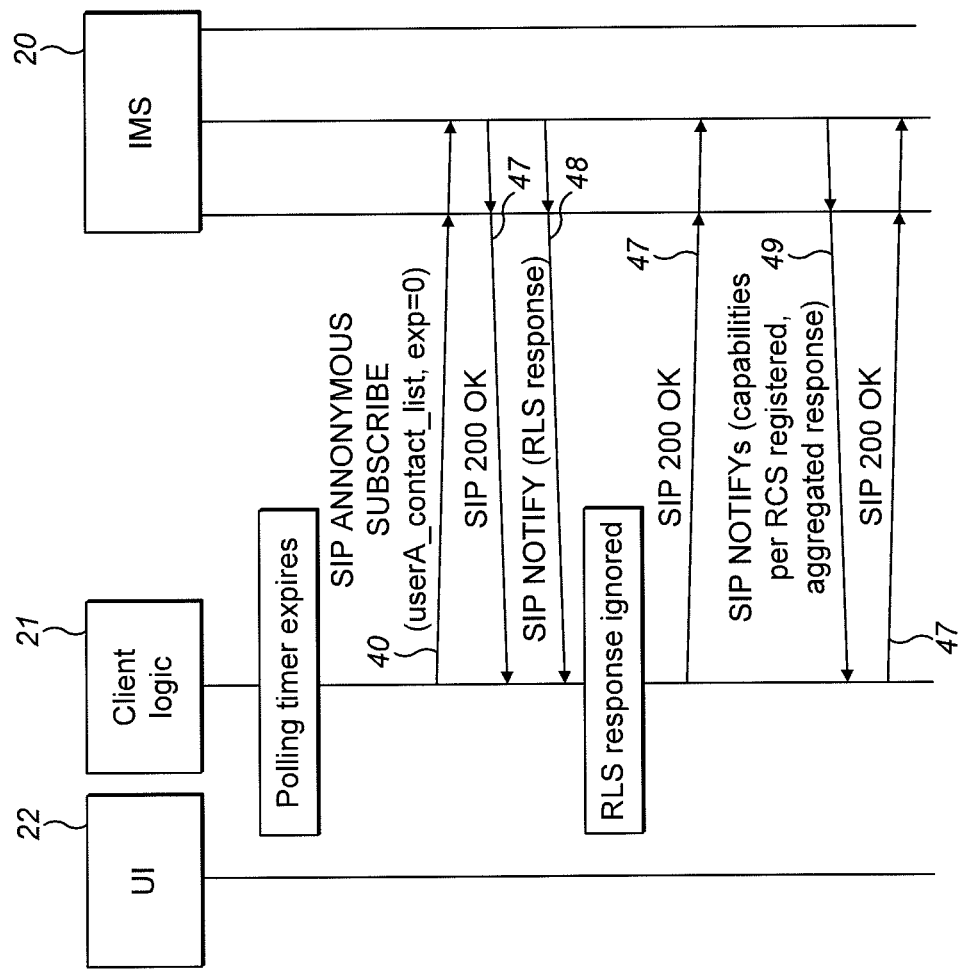
FIG. 4B shows a sequence diagram of capability status polling using presence.

FIG. 4B shows a sequence diagram of a polling mechanism configured to use the presence capability discovery mechanism. As described above, in this mechanism, the SIP ANONYMOUS SUBSCRIBE request is sent to the IMS core network 20 from the client device 21 (step 40). Accompanying the request is a contact list. This signifies to the IMS core that the device would like to know the presence and capability information of those contacts. The list may be previously stored as an XDMS list for interoperability between the client device and the IMS. When each request is successful it is acknowledged with a SIP '200 OK' response (step 47).

In response to the SIP ANONYMOUS SUBSCRIBE request, the IMS core may transmit an RLS response (step 48). The resource list server (RLS) is used in the IMS presence application, as it optimises the management of intensive presence signalling, and aggregates information to subscribers from within the IMS core network. The use of an RLS can reduce the demands of the IMS Presence application on constrained access network resources. As the social presence information is not relevant in this instance, the RLS response is ignored.

At step 49, the IMS uses the SIP NOTIFY method to transmit the capabilities of each registered user. As with the discovery described above, no reference will be made to any users that are not capable of communicating via the services and the response may or may not be aggregated depending on configuration.

When a new contact is added to the address book, it needs to be determined if the newly added MSISDN identifies an IMS subscriber. This sequence is shown in FIGS. 5A and 5B. FIG. 5A shows the sequence when the device is configured to use the presence discovery mechanism and FIG. 5B shows where the device is configured to use the OPTIONS discovery method.

In FIG. 5A, first, a SIP SUBSCRIBE message is sent to the IMS 20 (step 51). If the contact is an IMS subscriber, the IMS 20 returns a SIP '200 OK' message to the client device 21 (step 52). The user interface will likely then display the contact as a smart contact capable of advanced communication. The IMS 20 will then send a NOTIFY message to the client 21 with the cached capabilities (step 53) for storage by the client and subsequent usage in the user interface. At this point, the capabilities of the contact are not required to be up to date as the user has not selected the contact from the list, nor has begun to initiate communication. SIP OPTIONS will be used at a later time to ensure these capabilities are up-to-date. At this point, the key information is that they are an IMS subscriber and are potentially capable of smart communication. The up to date capabilities based on network connectivity can be calculated later when the individual contact is selected.

FIG. 5B shows the sequence of steps taken when a new contact is added to the address book and the client 21 is configured for OPTIONS discovery. A SIP OPTIONS message is sent from the client 21, through the IMS network 20 to the contact device 50 (step 54). The SIP OPTIONS message includes the capabilities of the client device. If the new contact 50 is provisioned for smart services and registered on the IMS, a SIP '200 OK' response is received including the capabilities of the device (step 55). If the new contact is not registered or provisioned for service, one of the aforementioned error responses is received (step 56). This information may be stored on the phone and may be periodically checked through polling.

Figure 6:
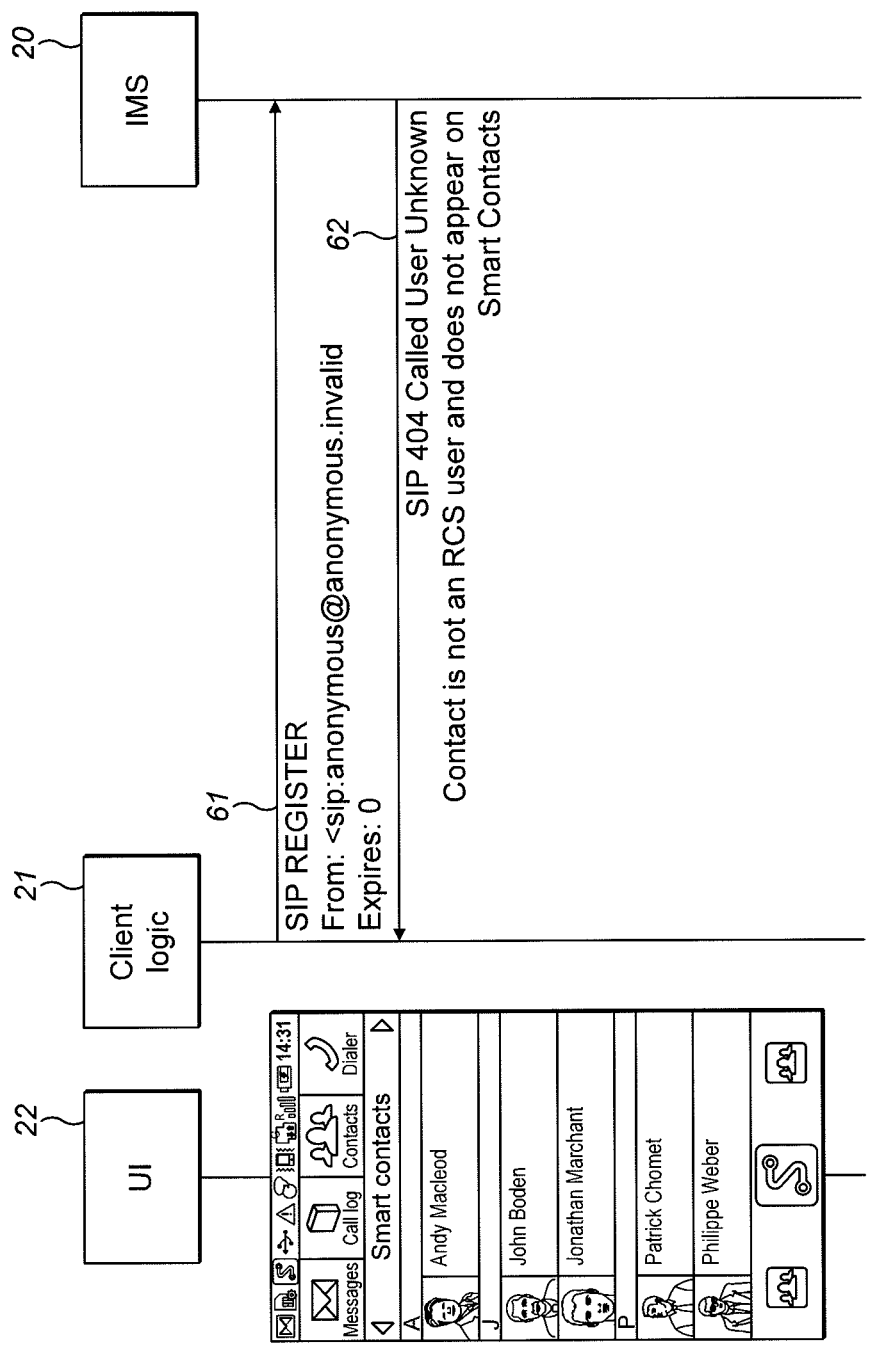
FIG. 6 shows a sequence diagram of contact addition where the contact is non-RCS capable.

When the client device is configured for presence discovery, if a new contact is not subscribed to the IMS and capable of advanced communications, as shown in FIG. 6, then when the client 21 transmits a SIP SUBSCRIBE message to the IMS 20 (step 61), it will return a SIP '404' message stating that the called user is unknown (step 62). At this point the user interface will show to the user that the contact is not a smart contact and no advanced communications will be allowed regardless of connectivity. The user interface may show the same (smart/not smart) information regardless of the discovery mechanism used.

In the address book of the user interface, the user will have access to the communications services. When the contact is selected, the service capability is updated via SIP OPTIONS to provide the current, real-time status for the client. The available services will be presented to the user for selection.

Figure 7:
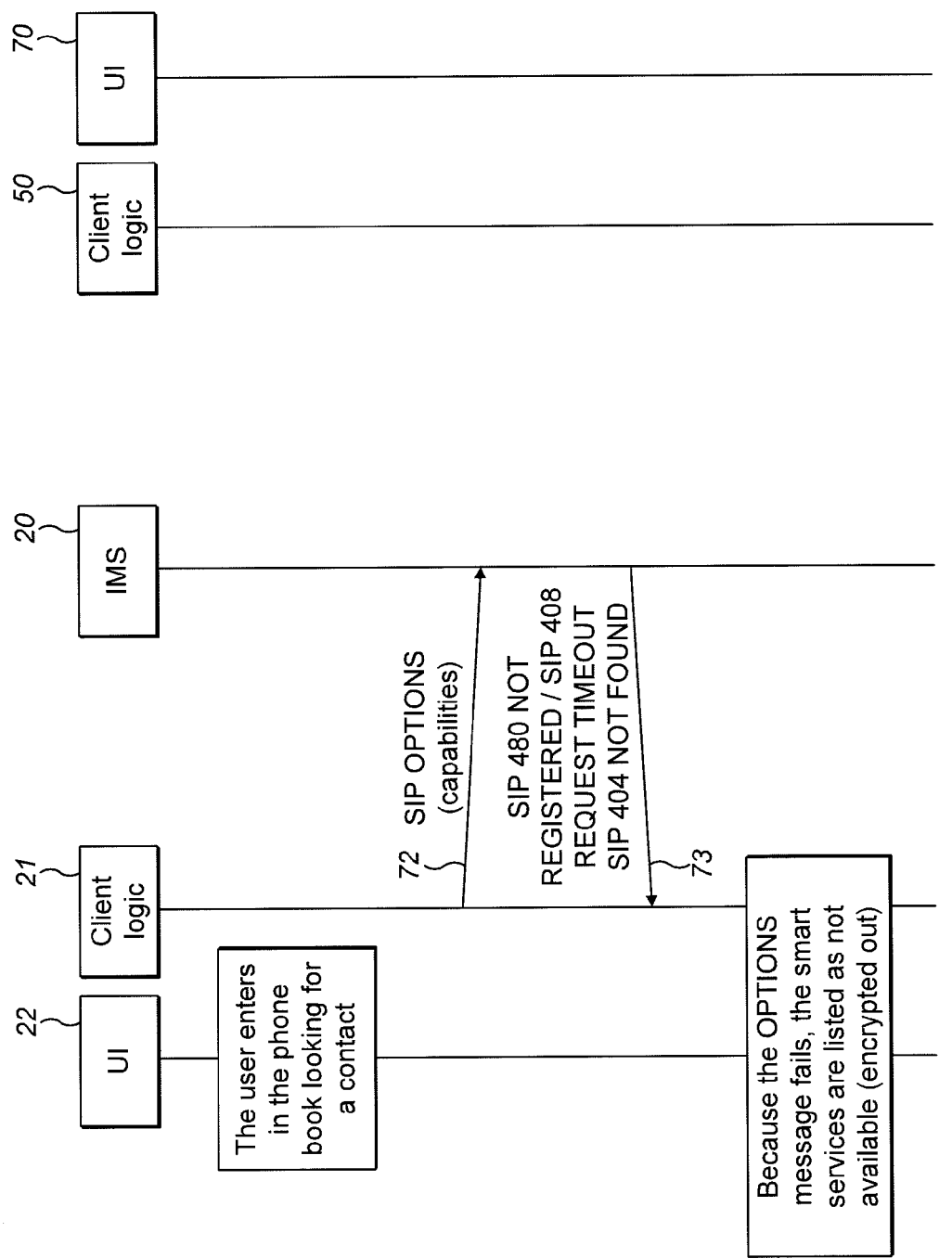
FIG. 7 shows a sequence diagram of contact selection where the contact is non-RCS capable.

First, in the user interface 22, the user opens the phone book looking for a contact. FIG. 7 shows the situation where the client is not available for communication. The user selects a contact in the address book. As soon as this happens, and provided the contact 50 is suitable (information previously obtained through presence or options discovery) the user interface 22 may either display only those always available communications or may indeed show those potentially available services identified through the discovery mechanisms.

Those unavailable services may be displayed as greyed out so that they cannot be selected or may not be displayed at all. Next, an OPTIONS message is sent to the client 50 to update the capabilities of the contact (step 72). In this scenario, an unsuccessful response is returned from the IMS core (step 73). Since the options message has failed, the smart communications are displayed as unavailable to the user in the user interface 22 and they are made unavailable. They may either be greyed out or not displayed at all.

FIG. 8 shows the sequence where the client device is capable for advanced communications. The user first enters into the phone book looking for a contact. Once a contact is selected, the cached capabilities may be shown or the basic communications only may be shown, for example, voice or SMS. An OPTIONS message is then sent to the contact device 50, routed by the IMS 20, to update the capabilities (step 81). In this scenario, the OPTIONS message contains the capability of the client device. The contact device 50 will then update the stored capabilities for the client device 21, which may have been previously cached for this user. The current capabilities of the contact device 50 will then be returned as a response (step 82). Once the OPTIONS message has arrived the available services that are displayed to the user is updated. Thus, if the advanced communication method is capable of being used by the device 21 it is made available for use to the user in the interface 22. For example, if the contact device 50 is on a high speed connection and is provisioned for the services, the file transfer option may be made available to the user.

In addition, if the capabilities returned indicate the contact device may be able to handle the communication service but the quality may be poor, the option may still be presented to the user, but the user may be informed of the potential low quality. For example, the file transfer option may be different to indicate that although the user is capable of receiving the file, they are connected on a low speed connection and thus the file transfer may be slow or intermittent. The user is able to make an informed decision on whether or not to send the file. The user experience is therefore significantly improved. If the local device has a low connection quality, the device may also inform the user accordingly or not allow the user to communicate using the service, It is worth noting that in the above scenarios if there is a communications problem with the IMS network 22, the advanced communication features will be/remain disabled.

An exemplary chat scenario, for example instant messaging, will now be described in the context of FIGS. 9 to 13. A chat service enables users to exchange messages between one or more users instantaneously. It does not require a high level of network connectivity and thus may be available to the user at all times, although both contacts may need to be registered for the service. One to one chat may be implemented using IM paper mode messaging and messages are discrete and not part of a session. The message bodies are contained within a SIP message which is acknowledged by the recipient in the usual manner. The scenario is shown in FIG. 9.

A SIP OPTIONS request is first used to determine whether video sharing or file transfer may be available with that contact 50 (step 91). For these services, both users will need to have good network connectivity. If capable, the connection options are made available to both users in the user interfaces 22, 70. The options are not presented and the device is prevented from using the services if either user does not have adequate network connectivity.

The SIP OPTIONS request and SIP OPTIONS response both contain the capabilities of the devices. Once the capabilities have been established, the message is sent from the client 21 to the IMS 20 and forwarded to the recipient device 50 (step 91). The response then follows the same route (step 92). A SIP MESSAGE request method is used to carry the body of the message transmitted using the chat application (step 93) and it is acknowledged using the usual SIP '200 OK' response (step 94).

Figure 10:
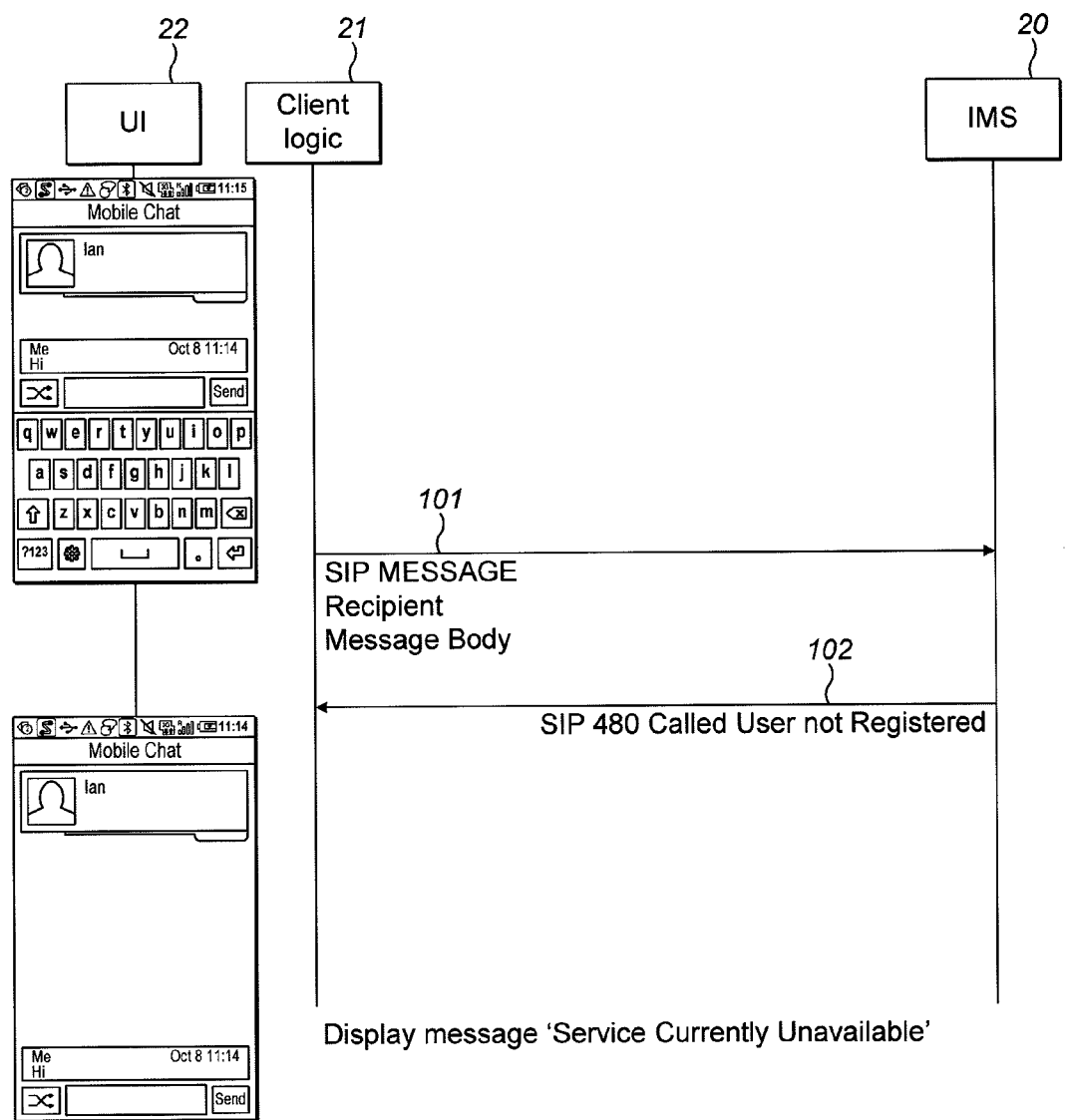
FIG. 10 shows a sequence diagram of chat where the contact is not registered.

FIG. 10 shows the sequence where the recipient 50 becomes de-registered from the IMS network 20. A chat can only be entered into if the second party is on-line. However, they may go off-line during the session. The user interface 22 shows a chat window to the user where the user can type messages for sending. The message is sent via a SIP message (step 101) and a SIP '480 called user not registered response' is returned by the IMS network 20 (step 102). At the user interface level 22, a service currently unavailable message may be presented to the user. The user may be prevented from sending messages or may be allowed to do so in case the recipient comes back on-line.

Figure 11:
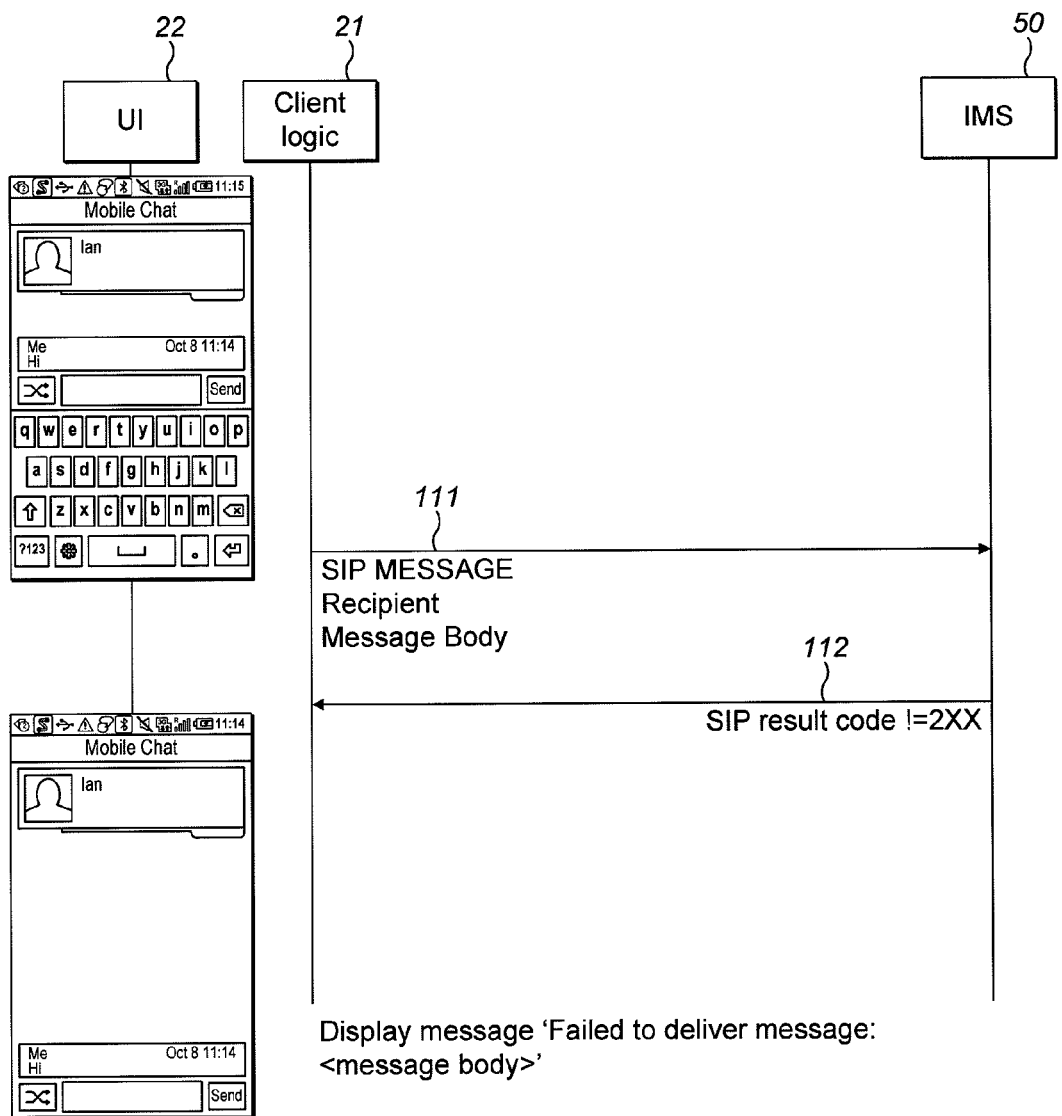
FIG. 11 shows a sequence diagram of chat where the message cannot be delivered.

FIG. 11 shows a scenario in which the instant message cannot be delivered. The IMS 20 indicates to the client 21 that the message cannot be delivered. The SIP message is first sent (step 111) and the SIP response code is returned indicating the message failure (step 112). The user interface 22 then displays that the message delivery has failed. The further sending of messages may be allowed in case these might be delivered or it might be prevented.

Figure 12:
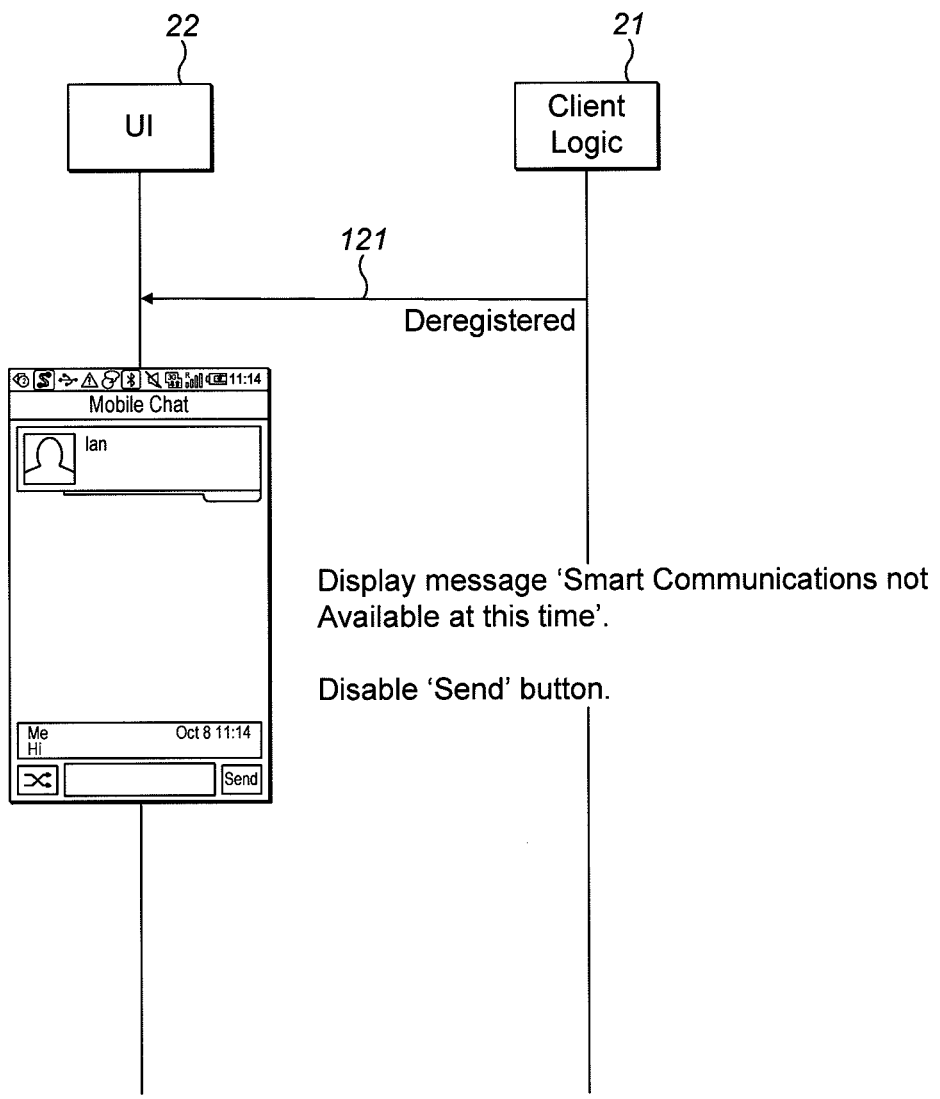
FIG. 12 shows a sequence diagram of chat where the contact has de-registered.

FIG. 12 shows a scenario in which the sending device 21 becomes de-registered from the IMS network 20. The sender's device may lose network coverage or become de-registered for another reason. The client 21 informs the user interface 22 that it has become de-registered from the network (step 121) and the user interface 22 displays that the smart communications are not available at this time. The send button is disabled so that the user interface does not indicate that message sending is possible, thus improving the user experience. The send button may be enabled when the user is registered with the IMS again. The registering procedure is shown in FIG. 2. In the above scenarios, when the connection and chat is no longer possible, the user may be directed to a back-up mechanism to send an SMS message to the contact.

Figure 13:
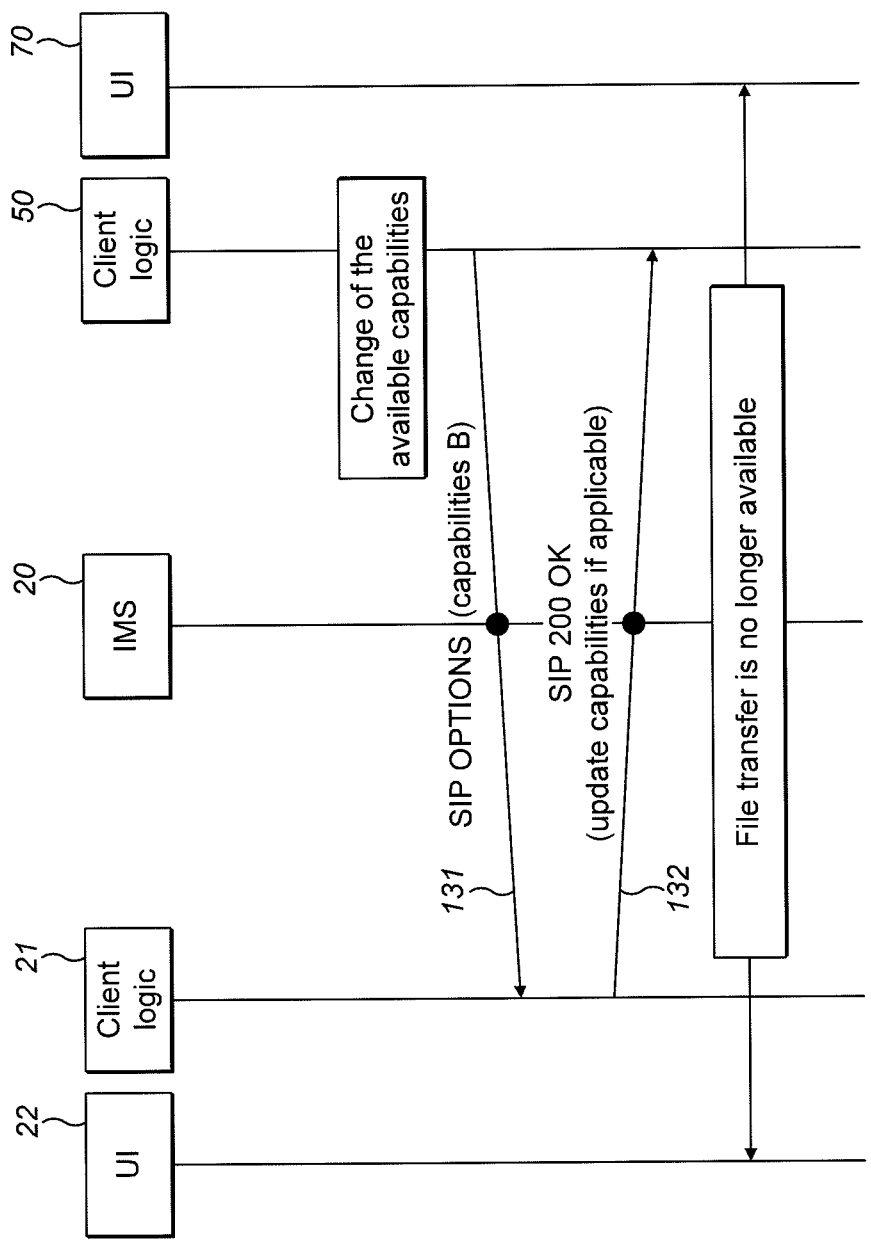
FIG. 13 shows a sequence diagram of chat where capabilities have changed.

When both users are in a chat session, the capabilities of one of the users may change, for example, they may move from an area of 3G coverage to an area of 2G coverage. Although the capabilities have changed, the chat may still continue as it is not affected by the change in network connectivity. Although the chat may continue, the other contact should be informed of the change so that their communication options may be updated. This is done using a SIP OPTIONS message as usual. When the client's device 21 detects a change, the SIP OPTIONS message is sent to the first user (step 131). This is acknowledged as usual with a SIP '200 OK' message containing their current capabilities (step 132). The available options presented to the user in the interfaces 22 and 70 are changed as applicable. For example, if file transfer is no longer available, the icon is either displayed as greyed out or may be removed. The option is no longer selectable and communication is no longer allowed. This sequence is shown in FIG. 13.

It should be emphasised that in the scenarios described herein it is often assumed that the first user's device has suitable network connectivity. If the client device does not, the device may not be allowed to communicate using the smart or advanced communication services. The capabilities exchange will reflect this, as will the user interface.

Figure 14:
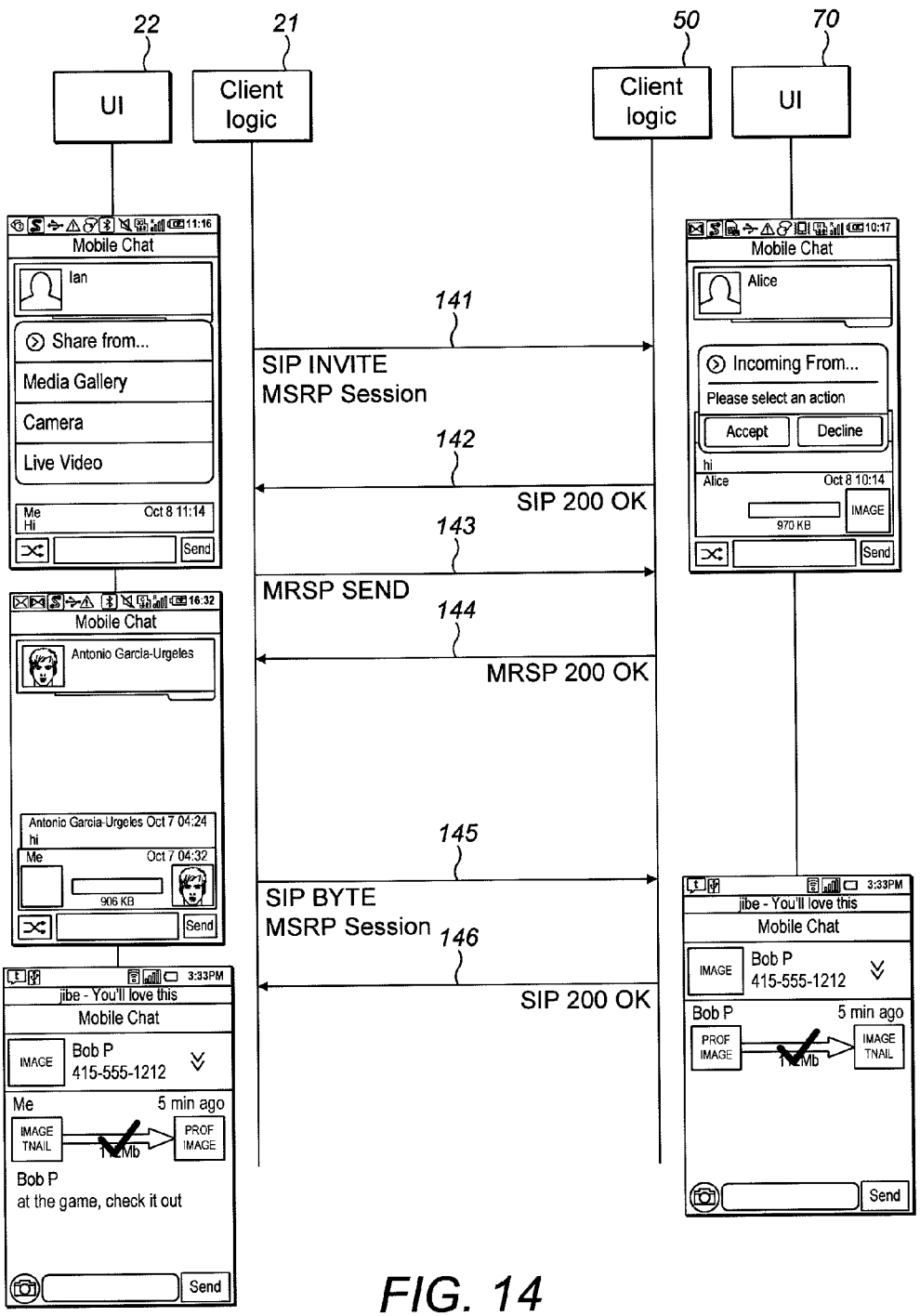
FIG. 14 shows a sequence diagram of file transfer.

FIG. 14 shows a sequence diagram of file transfer communications. File transfer may be initiated from within a chat session or may be independent of it. It is illustrated that file transfer is implemented using the MSRP protocol and messages in a SIP session. However, it will be understood that any suitable transfer protocol may be used. The MSRP protocol is defined in RFC 4975. MSRP has a similar syntax to SIP, i.e. follows the request and response model.

When the user decides to send a file by file transfer, firstly the client 21 sends a SIP INVITE message to the contact device 50 (step 141). The SIP INVITE request method will include an invitation to commence an MSRP session. When the invitation is accepted by the user of the second device via the interface 70, a SIP '200 OK' message is returned (step 142). As the contact has accepted the invitation, the file is sent using the MSRP protocol send message (step 143) and acknowledged using an MSRP 200 OK response (step 144).

Figure 15:
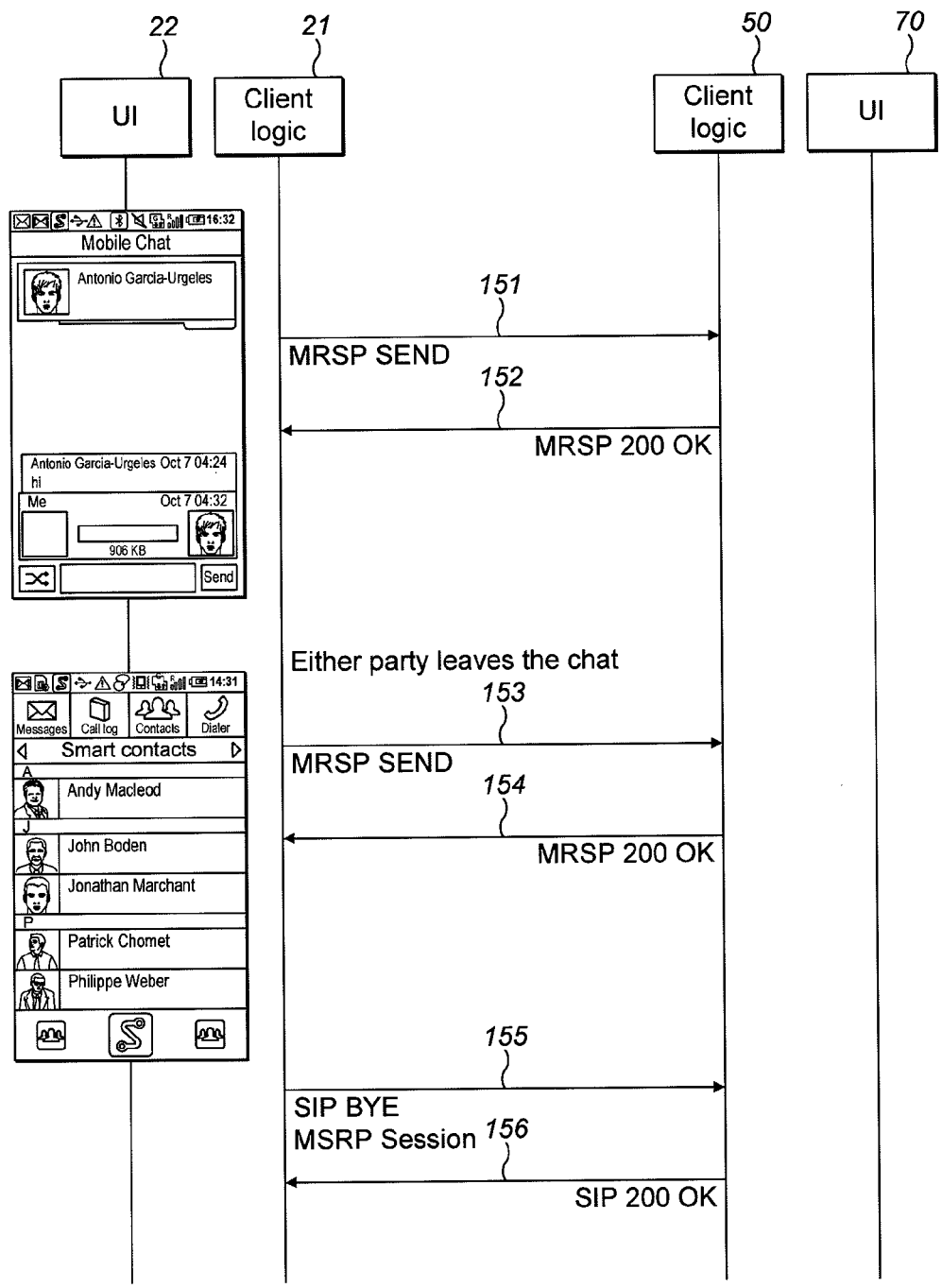
FIG. 15 shows a sequence diagram of leaving chat during file transfer.

When the file has completed transfer, a SIP BYE message (step 145) is sent to terminate the session, which is acknowledged (step 146). Either party is free to leave a chat session during a file transfer. The file transfer will continue with suitable notification being provided when it completes. This is shown in FIG. 15. As with the scenario of FIG. 14, the MSRP send message is sent and acknowledged to enact the file transfer (steps 151 and 152). It continues when either party leaves the chat session in the user interface 22; the transfer operating in the background (steps 153 and 154). When the transfer completes, a SIP BYE message is sent and acknowledged as usual (steps 155 and 156) and a suitable notification provided in the interface 22. It should be noted that MSRP may not only be used to send messages but information about the activity status on both ends.

Figure 16:
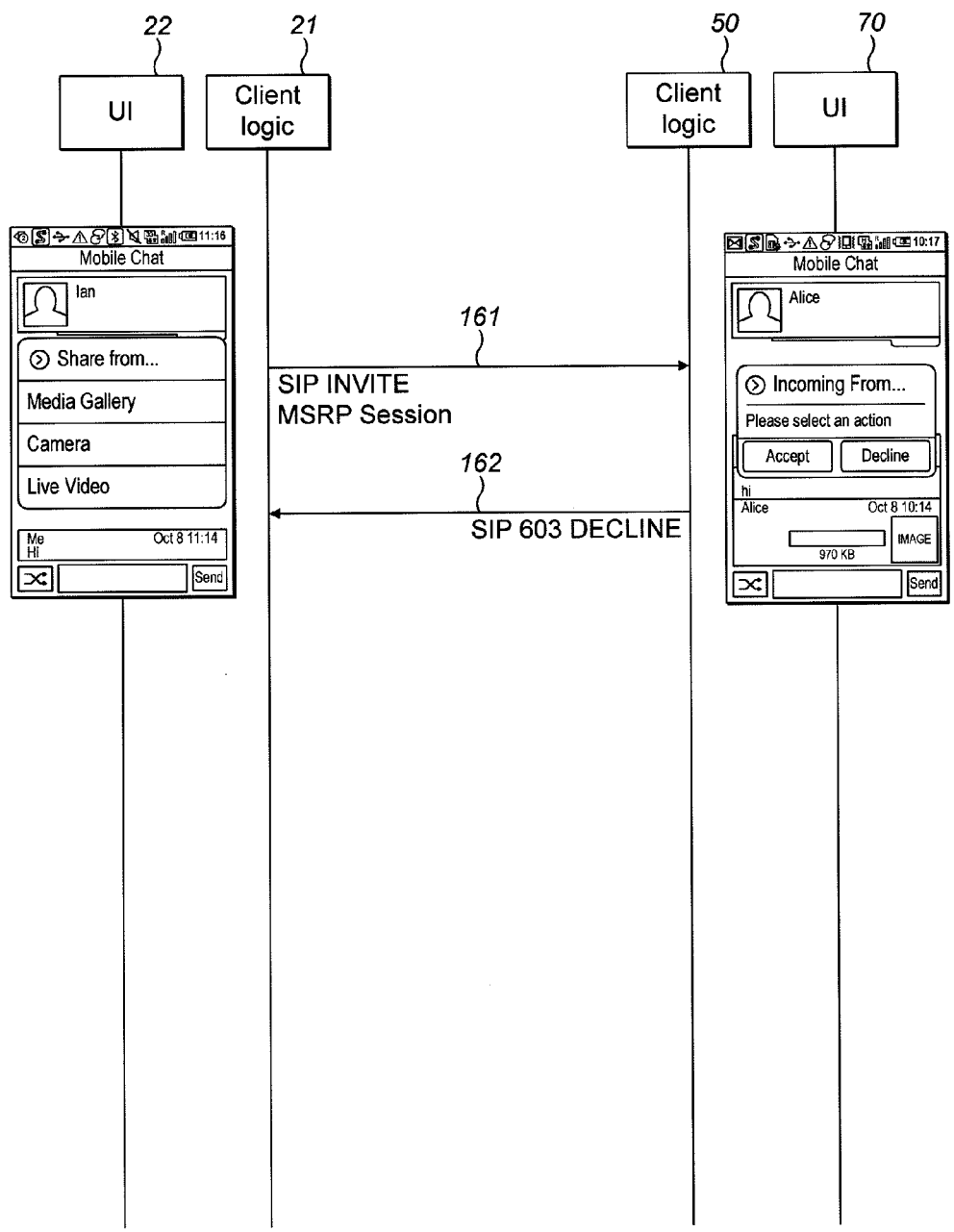
FIG. 16 shows a sequence diagram of file transfer being declined.

Image and video sharing may also be available from within a chat session. FIG. 16 illustrates that a recipient may decline a file share invitation. The invitation is sent as described above, and a SIP 603 DECLINE message sent (steps 161 and 162) when the contact declines the invitation in the user interface 70.

Figure 17:
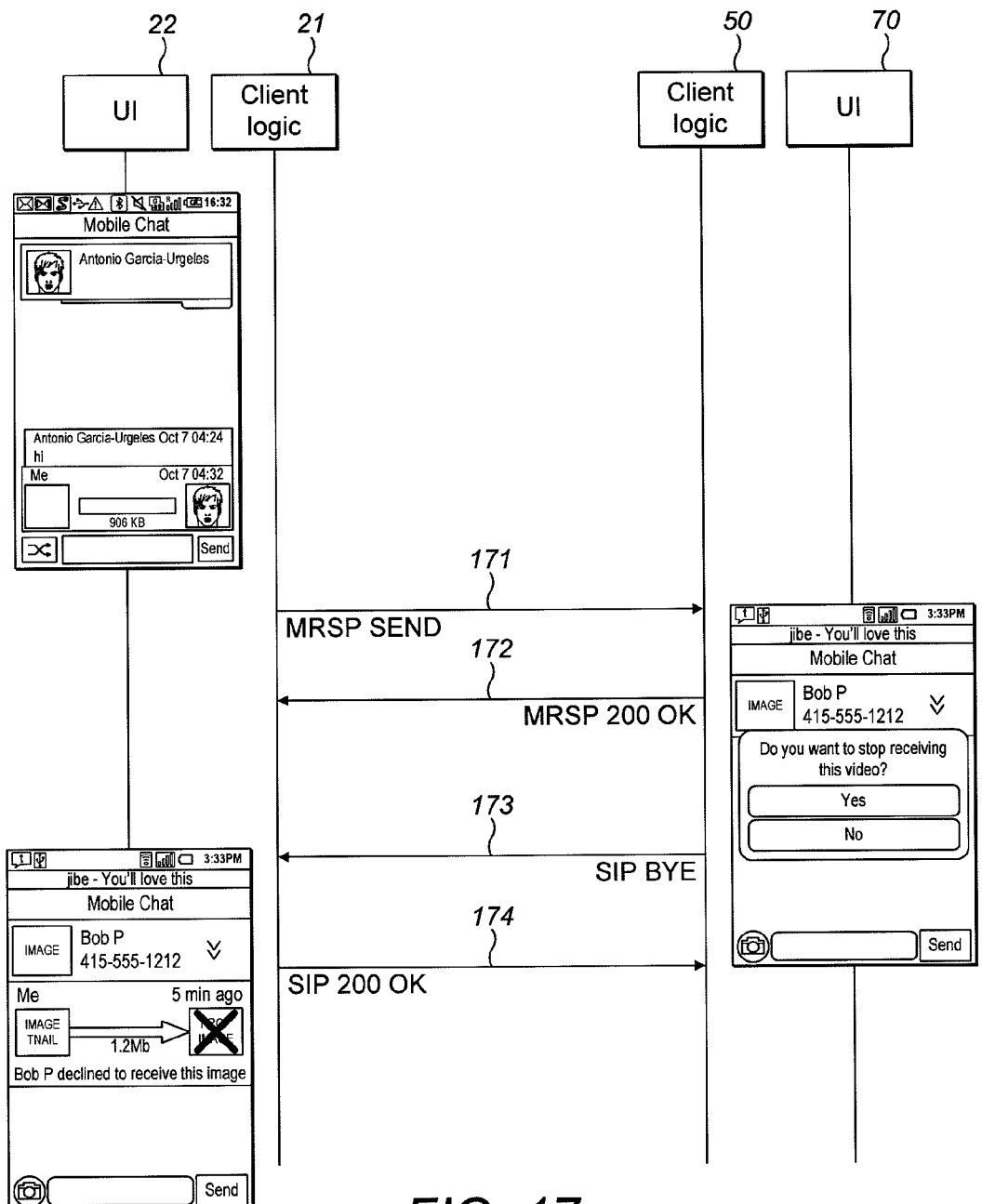
FIG. 17 shows a sequence diagram of file transfer being cancelled.

An in progress file transfer can be cancelled at any point by either party. This is shown in FIG. 17. The transfer is initiated using an MSRP SEND and acknowledgement as usual (steps 171 and 173). To cancel the transfer, a SIP BYE message is transmitted and then acknowledged if received (steps 173 and 174). In the user interface 22, a visual indication is used to show that the in progress file transfer was cancelled.

Figure 18:
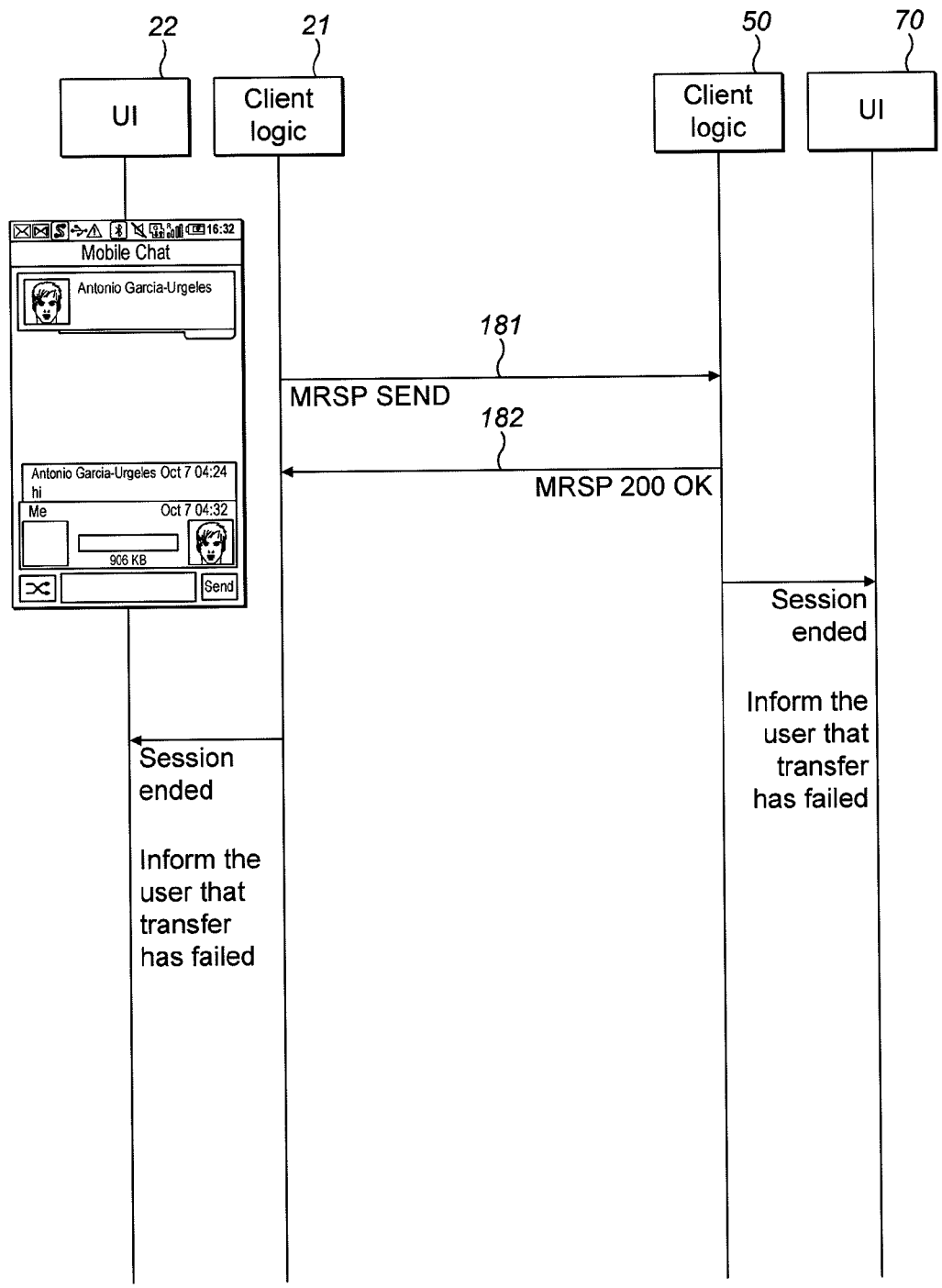
FIG. 18 shows a sequence diagram of connection being lost.

In addition to the transfer being cancelled, the recipient or sender may lose data connection during the process. As shown in FIG. 18, the MSRP SEND and acknowledgement are sent as usual (steps 181 and 182). The session may be ended at any point and the user interfaces 22 and 70 will inform the users that the transfer has failed.

Figure 19:
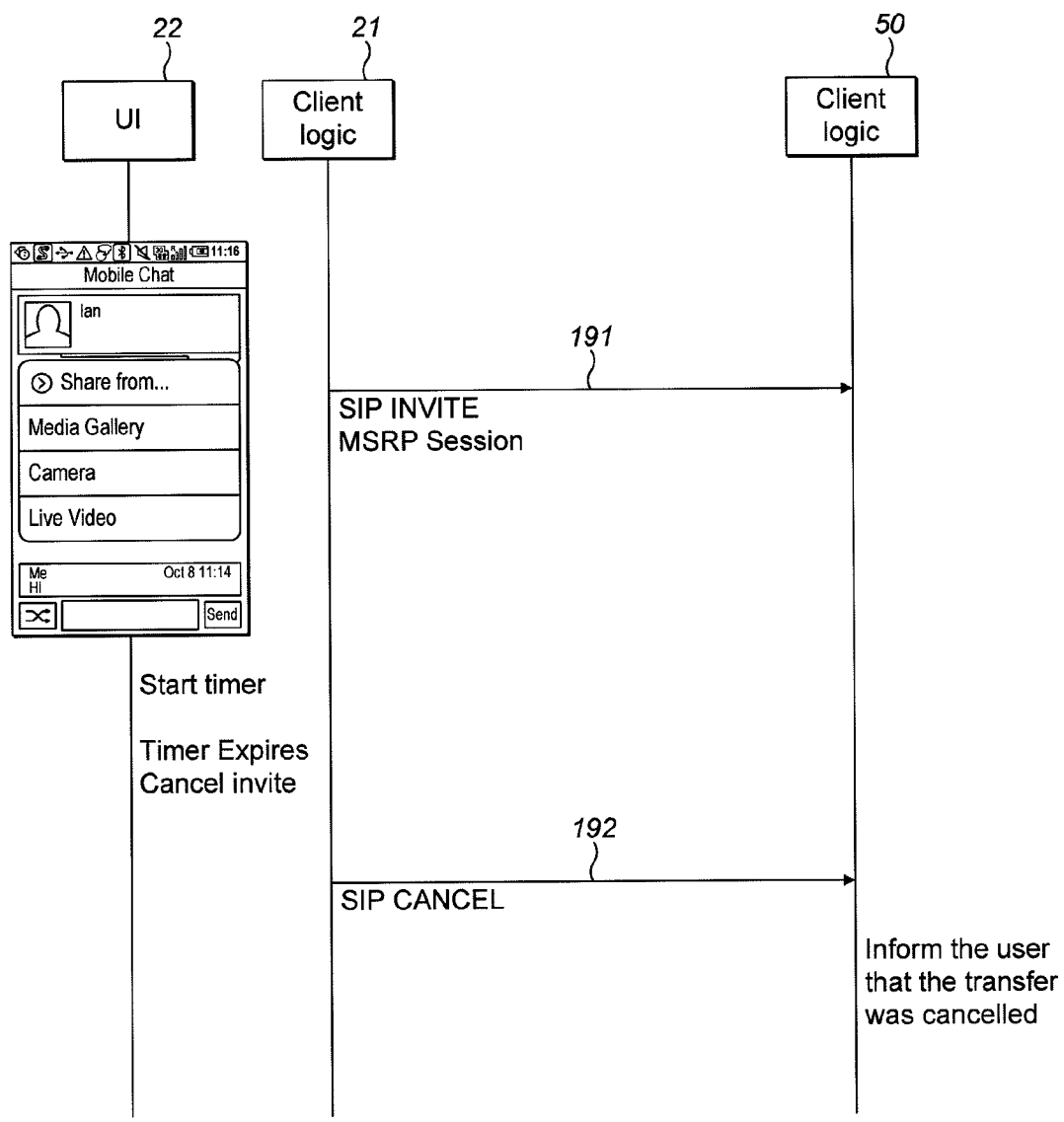
FIG. 19 shows a sequence diagram where there is no response to an invitation.

It is of course possible that the recipient may not respond to an invitation to accept or decline a file transfer. The user may be away from the device or may be busy. In this situation, the user interface 22 of the senders device 21 will usually have a timer that expires. When this timer expires, the session is terminated from the initiator 21. FIG. 19 shows the steps involved. The SIP INVITE request is sent to a second device 50 including an invitation to start an MSRP session (step 191). The timer is started at the sender. When this expires, a SIP CANCEL message is sent to the second device 50 (step 192) where the user may or may not be informed that the transfer was cancelled depending on the configuration. In fact, the user may not be aware as to the existence of an attempted file transfer.

In one exemplary embodiment, live video sharing is only presented to the user when engaged in a voice call with an on-line capable subscriber who is currently connected on a 3G or faster connection. The communications service may also be used when the device is not part of a circuit switched voice call.

Figure 20:
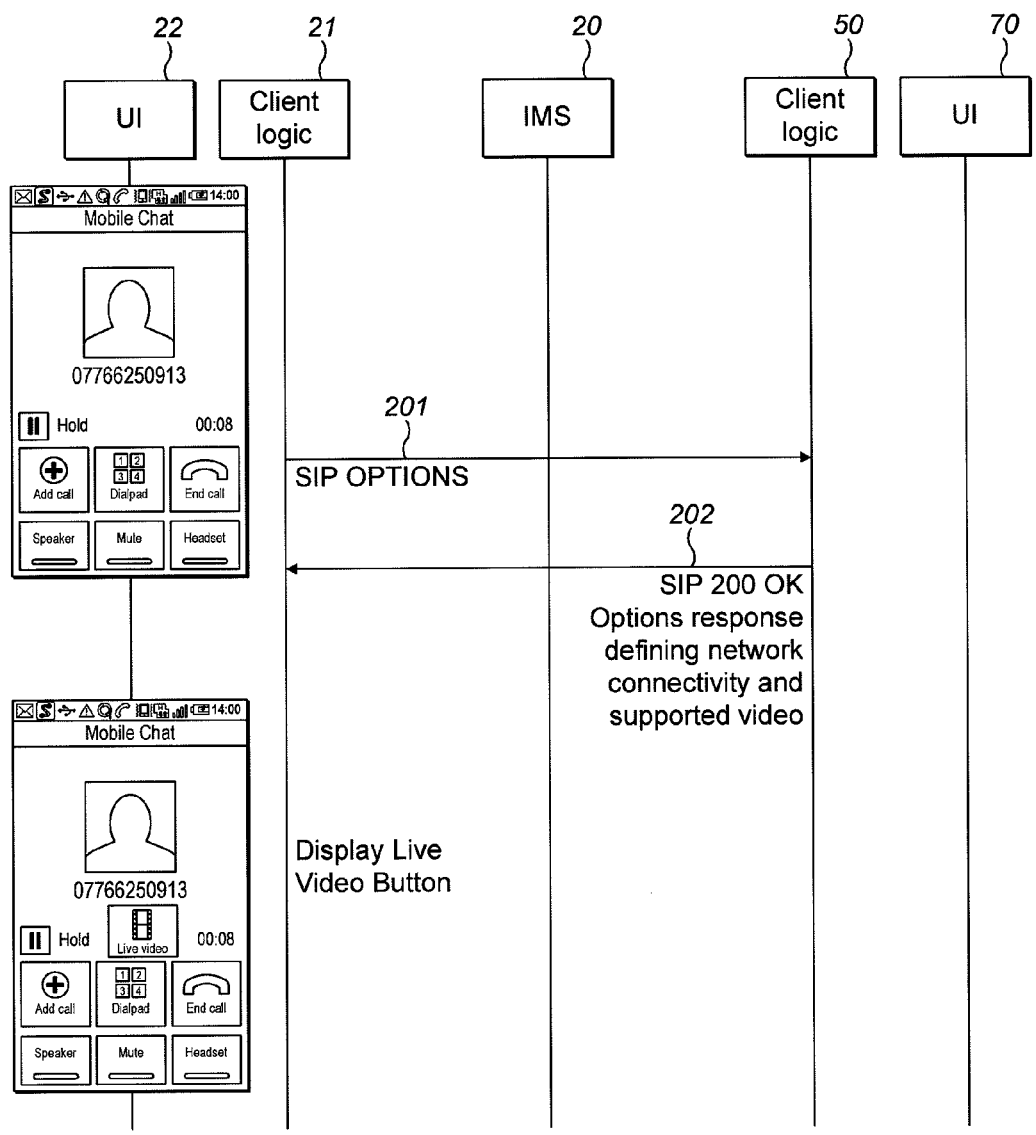
FIG. 20 shows a sequence diagram of video sharing during call.

FIG. 20 shows a sequence diagram of live sharing. Once the user is connected to another party, if the other party is a capable subscriber, in order to determine the ability to provide a video the device sends a SIP OPTIONS message (step 201). This is received by the second device 50 and is used to determine if video sharing is available and offer it to a user of the second device in the interface 70. The SIP '200 OK' acknowledgement is transmitted through the IMS 20 (step 202) and returns the capabilities of the second device 50 depending on the network connectivity of the device 50 and the handset capabilities and status. The SIP OPTIONS response is used to determine whether or not video sharing is available during the voice call.

In this exemplary implementation, both parties must be on a 3G or faster connection for effective video sharing. The live video option is displayed to the user using the interface 22, only if the network connectivity of both devices is adequate (determined from the SIP OPTIONS messages). If the network connectivity is inadequate, the option is disabled in the interface 22 and the devices are not allowed to communicate using video calling.

Additionally, the user interface may display to the user, based on the capabilities of the recipient device, that the communication service may be possible, but may be of poor quality. For example, in this example, the user option to communicate using video may be presented but the user may be informed that the recipient or local device has a low quality connection and therefore the quality of the video will be poor. The capability exchange may indicate the connectivity of the device to enable this information to be presented. This display of the potential quality of the communication service may be equally applied to the other scenarios described herein.

Although it may be agreed that video is available by SIP OPTIONS negotiation during the voice call, one of the handsets may drop to a slower connection, for example 2G, during the call. At this point, the video sharing option is disabled and the device is not allowed to communicate using this communication method. As shown in FIG. 21, when the hand set drops to 2G connectivity, the live video button is removed and a SIP OPTIONS message is sent (step 211) with updated capabilities to indicate that video is no longer available as the network connectivity has changed. The OPTIONS response defines the network connectivity and supported video of the second device 50 which may be adequate to support video (step 212). This will not matter as the first device 21 has inadequate connectivity. When the connectivity is restored, an OPTIONS message is sent again to ensure the video service is available. If both parties have 3G connectivity the devices will now be allowed to use the communication method if the users so wish.

If the users are connected on a suitable connection, and are capable of video sharing, the option of communicating via this method may be presented to the user. In one embodiment, this may only be presented when the users are engaged in a voice call.

Figure 22:
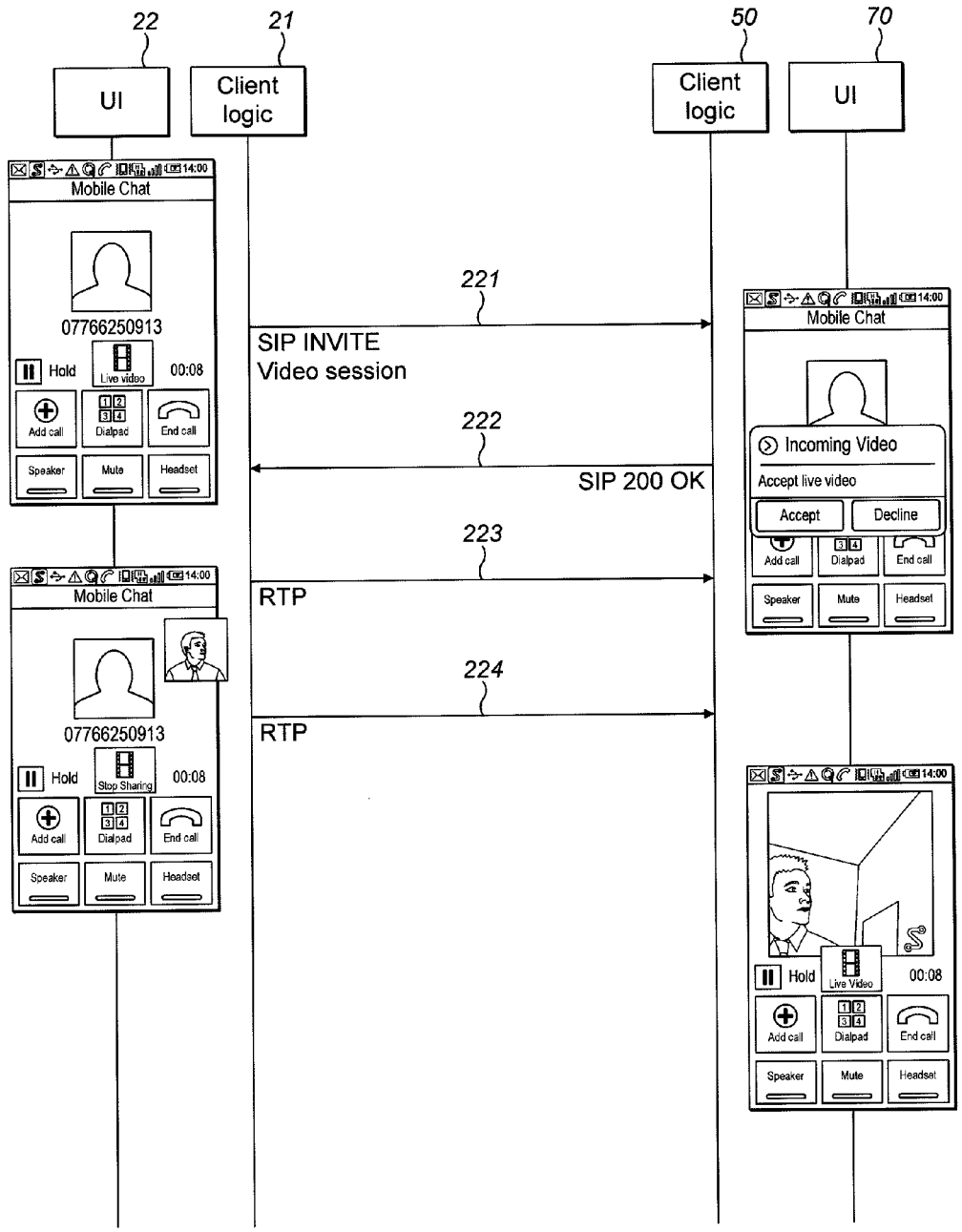
FIG. 22 shows a sequence diagram of video sharing.

As shown in FIG. 22, video sharing may be delivered using the real time transport protocol (RTP). RTP was first published in 1996 in RFC 1889 and superseded by RFC 3550 in 2003. It is used for delivering audio and video over IP networks. The user is invited into a session using the SIP INVITE message and corresponding acknowledgement (steps 221 and 222). RTP is then used to share the video (steps 223 and 224). The invitation may be declined as with the communication methods described above where the relevant messages are returned instead of the OK acknowledgment.

Figure 23:
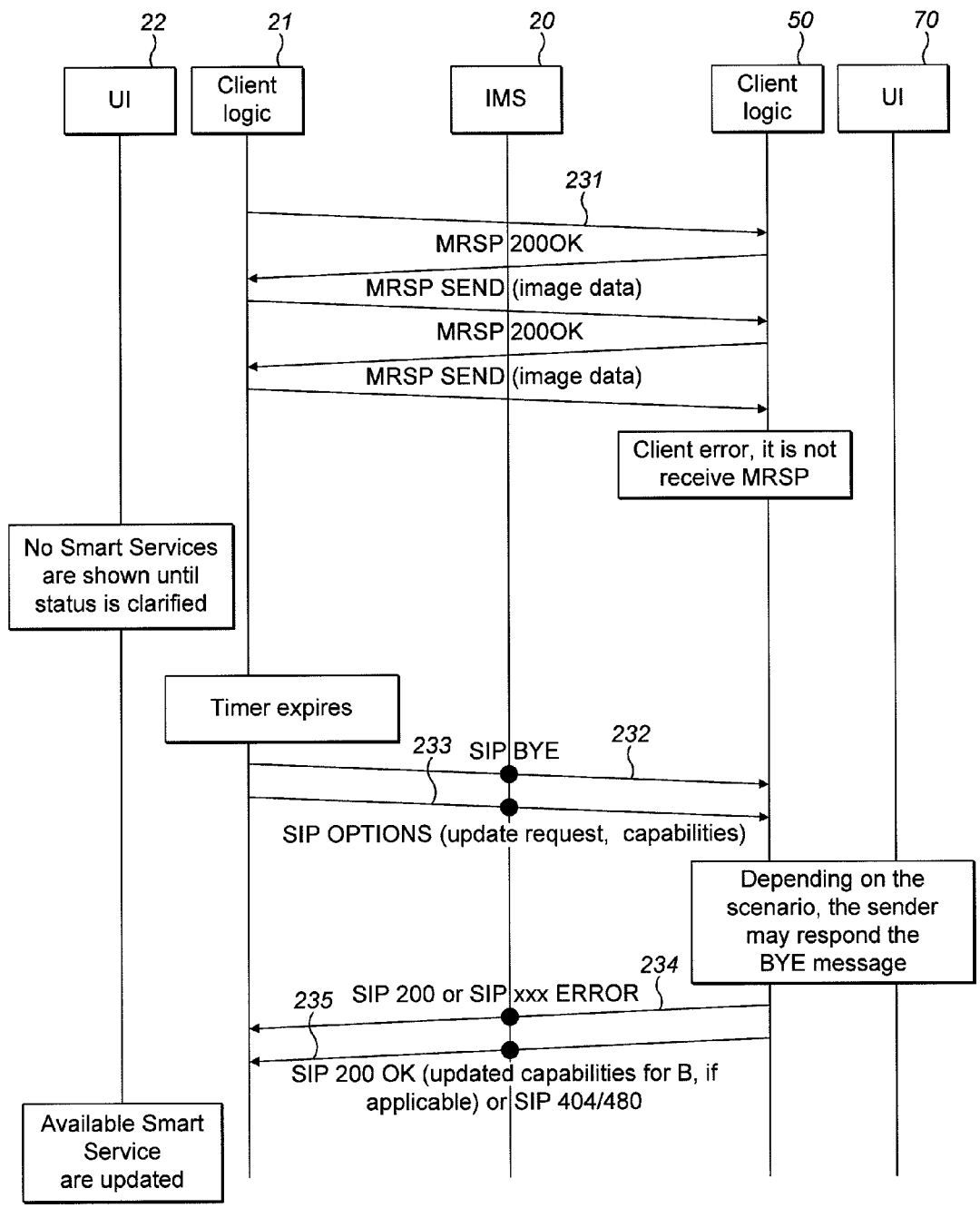
FIG. 23 shows a sequence diagram of a non-graceful drop from 3G to 2G.

In the scenario shown in FIG. 23, the non-graceful termination of video or image sharing occurs. In this scenario, an image MSRP transaction was taking place when the connection to the network failed (step 231). This might be caused by, among others, client error, because the phone reboots, there is no data bearer or a switch in data carrier (e.g. 3G+ to 3G) causes an IP layer configuration. A timer expires on the first device when no activity takes place. A SIP BYE message is then sent along with a request to update the capabilities of the second device 50 using SIP OPTIONS (steps 232 and 233). The second device 50 may respond with an acknowledgement of the SIP BYE or a SIP ERROR as relevant (234). The IMS 20 may respond to the SIP OPTIONS with a user not registered response or the client device 21 may respond to the SIP OPTIONS with updated capabilities (step 235) depending on the error that caused the non-graceful determination. The available smart services may then be updated on both or either device based on the received and transmitted capabilities or error messages. No capabilities are received if a SIP ERROR message or SIP unregistered message is transmitted from the IMS 20. The first device 21 will not be allowed to use any of the advanced communication methods, i.e. smart services, as the second device 50 will be deemed unavailable.

Figure 24:
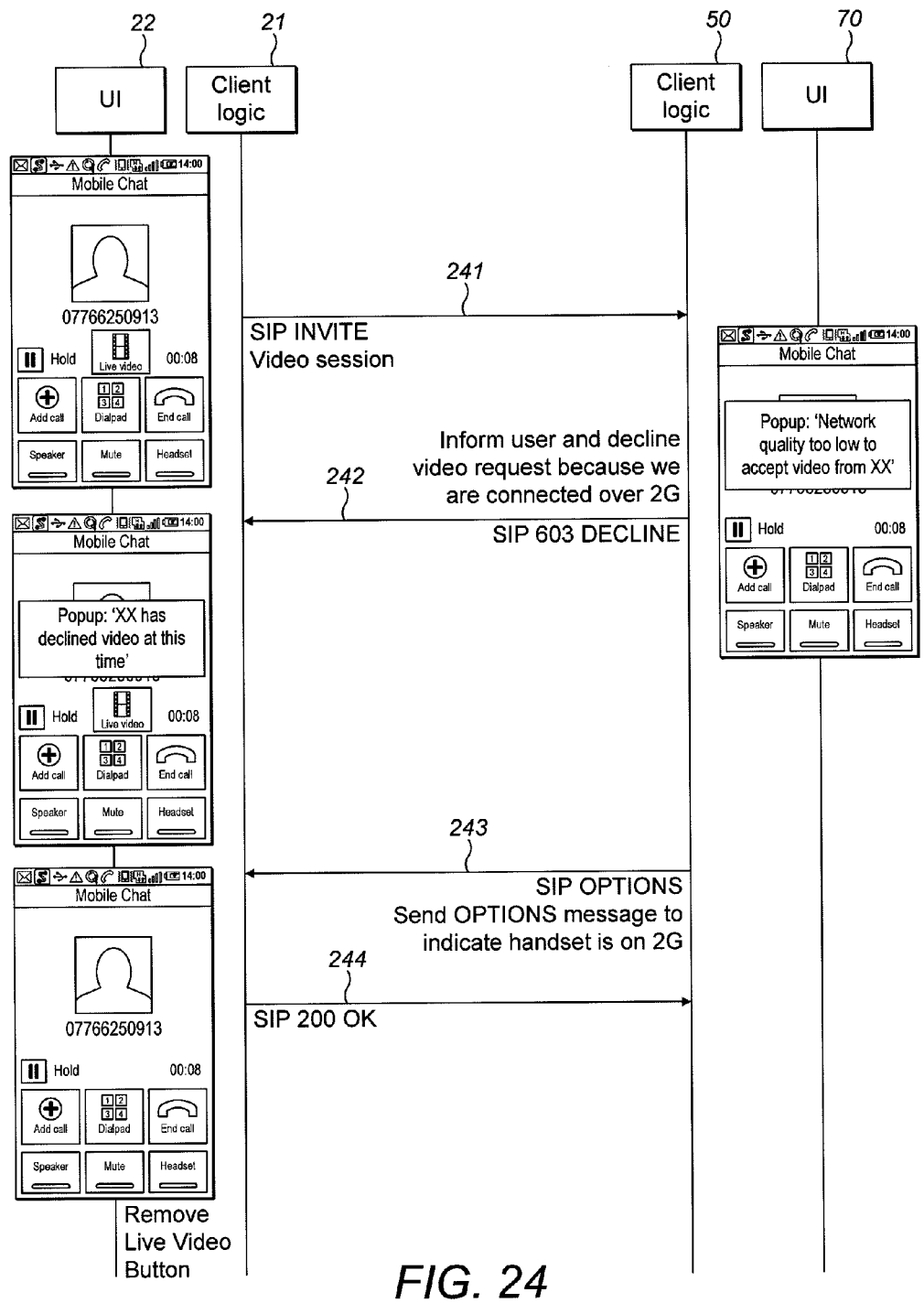
FIG. 24 shows a sequence diagram where a high required data transfer rate invitation is sent to a device having an inadequate connection; and, FIG. 25 shows a sequence diagram of the push of contact information.

It is possible for a video invitation to be received while on a 2G connection. This may occur when, for example, the connection has changed and the capabilities have not been updated. The user may issue an invitation to partake in a high data transfer rate communication such as a video session as shown in FIG. 24. The second device will decline the video request based on the network connectivity and will issue a SIP 603 DECLINE response (steps 241 and 242). The user is informed of this in the user interface 22. Once this has been detected by the second device 50, it will issue an OPTIONS message indicating that the device network connectivity is low, for example 2G (step 243). The first device will acknowledge this (step 244) and transmit its own capabilities as usual. The first device 21 is now no longer able to use the communication method (e.g. video) and in the example of FIG. 24, the live video button is removed.

Figure 25:
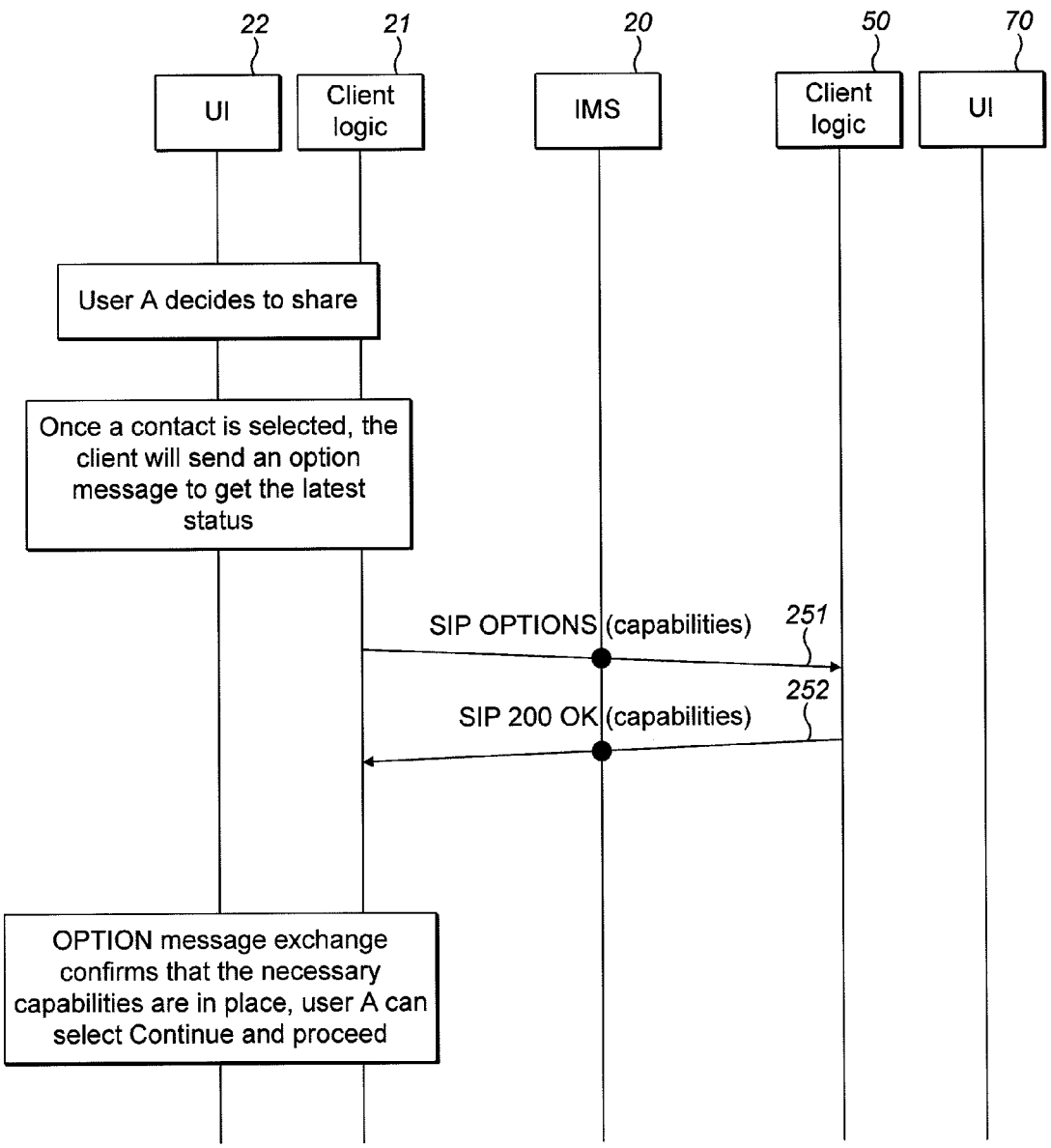

The sharing of contact information, through use of a v-card for example, may be implemented using an MSRP session in the same way as a file transfer. Before the contact information can be sent, the device will identify the capabilities of the second device 51 to determine if they are able to receive the contact information based on their network connectivity. Contact sharing is only available if the client device has adequate network connectivity and quality of service. As shown in FIG. 25, this is based on the SIP OPTIONS message and acknowledgement as described in many of the scenarios above (steps 251 and 252). The user first enters into the phone book looking for his/her profile. In this case, the user decides to share the profile with other users. The share button only becomes available if the capabilities of the first user are such that the file transfer service can be accessed. For example, if the device is in a low network connectivity area, the file transfer and hence contact information pushing service will not be available to the device. Only those clients which are available for receiving the content information i.e. have capable hardware determined through the polling mechanisms and cached capabilities, are available for file transfer.

The user of the first device can choose one or more contacts to share the profile. Once a contact is selected, the client will send a SIP OPTIONS message, as shown in FIG. 25 steps 251 and 252, to determine the latest capabilities. The SIP OPTIONS message should be fast enough for the user interface 22 transitions to hide the delay between screens. Once the contact is selected and the SIP OPTIONS message exchange confirms that the necessary capabilities are in place, the user of the first device can select continue and proceed with sharing the contact information via the file transfer procedures described above and shown in FIG. 14.

There are possible scenarios where the device may be visiting a region outside the area of coverage provided by the network operator and, potentially, roaming into the network of a different network operator. Many of the communications described herein may incur significant roaming charges. Thus, advantageously, the user may be presented with specific configuration options for each service to enable or disable the service as required. This information would be included in the capabilities information. The user may also be presented with the option of communicating using the service as and when required in addition or instead of an all encompassing configuration setting. The user may also disable data connectivity thus inhibiting the device from communicating using many of the described services. The capabilities will, of course, reflect this.

It will be understood that the exemplary embodiments described herein may be implemented over data only links, in combination with voice or as stand alone services. In addition, the features described may be implemented in conjunction with known user experience models and communication services. Although the present invention has been described in terms of specific services, it will be understood that any services and communication methods will be suitable for use with the principles of the present invention. Services may be defined in the future that will be equally applicable with the embodiments described herein.

It will be understood that a key advantage of the invention is that it is bearer and device agnostic. This provides a much greater connectivity between a wider user base (in comparison with more device or bearer-specific approaches) whilst at the same time delivering an enhanced user experience to each of those users. The use of SIP in the delivery of this functionality provides an efficient means of implementation of the invention.

The embodiments described herein may be implemented on any device operating system. It will be understood that the key service logic is described and that the skilled person may implement these features differently when presenting them to the user. The processes described herein may be automated or may be performed upon manual instruction.

While terminals are often referred to as "mobile" in the preceding discussion the term "mobile" should not be construed to require that a terminal always be mobile, merely that it has the capability of being in communication with a wireless telecommunications network or IP network, depending on the context, which allows mobility. For instance, a PC terminal or a machine to machine (M2M) client that has never moved from any particular geographic location may in a sense be considered mobile as it could be moved to a different location while still accessing the same network. The term "mobile terminal" is used in the present discussion just to be read as including the possibility of a terminal that is "semi-permanent" or even "fixed" where the context does not contradict such an interpretation. One example of such devices would include an Apple iPod® or Apple iPad® which may be wirelessly connected to an internet router via a conventional WiFi connection which can communicate with an IP network (internet).

Additionally, the "network" in the preceding discussion should be thought of as having at least a wireless element and, typically, internet protocol (IP) elements.

The invention claimed is:

1. A method for facilitating communication between a first communication device that communicates with a second communication device using a network supporting first and second different communication methods, comprising the steps of:
   allowing the first communication device to communicate with the second communication device using the first communication method;
   determining the first communication device status indicator of the ability of the first communication device to communicate using the second communication method based on a current network connectivity of the first communication device;
   registering the first communication device on a service platform of the network; in response to a selection of a user associated with the second communication device from a display of users on the first communication device, requesting from the service platform the second communication device status indicator of the ability of the second communication device to communicate using the second communication method, the request including the first communication device status indicator;
   receiving the second communication device status indicator from the service platform; and
   allowing the first communication device to communicate with the second communication device using the second communication method in dependence on the first communication device status indicator and the received second communication device status indicator;
   wherein the second communication device status indicator is dependent upon the current terminal hardware status, the current terminal hardware status including at least one of a battery life, file storage space of the second communication device, and current network connectivity of the second communication device.

2. The method according to claim 1, wherein the second communication device status indicator further depends on at least one of: (i) communication method capability of the second communication device; (ii) manually input user status information; (iii) automatically generated user status information; (iv) device hardware functionality; (v) device software functionality; and (vi) communication method quality of service.

3. The method according to claim 1, wherein at least one of the first and the second communication devices is a mobile telecommunications device.

4. The method according to claim 1, further comprising the steps of:
   determining the first communication device status indicator of the ability of the first communication device to communicate using the second communication method based on the current network connectivity of the first communication device; and
   allowing the first communication device to attempt to communicate with the second communication device using the second communication method in dependence on the first communication device status indicator.

5. The method according to claim 4, wherein the requesting step further comprises forwarding the first communication device status indicator to the service platform.

6. A The method according to claim 1, wherein the step of allowing the first communication device to communicate with the second communication device using the second communication method in dependence on the received second communication device status indicator includes displaying communication options for the second communication device to a user of the first communication device in accordance with the received second communication device status indicator.

7. A The method according to claim 1, further comprising the step of, before the step of requesting the second communication device status indicator, displaying the first communication method as a selectable option to the user and not displaying the second communication method as a selectable option, such that, when selected, the first communication device initiates communication with the second communication device using the first communication method.

8. The method according to claim 1, wherein, when the first communication device is registered on the service platform, displaying the first communication method as a selectable option to the user and not displaying the second communication method as a selectable option, such that, when selected, the first communication device initiates communication with the second communication device using the first communication method.

9. A The method according to claim 1, wherein, when the second communication device is not configured for using the second communication method, displaying the first communication method as a selectable option to the user and not displaying the second communication method as a selectable option, such that, when selected, the first communication device initiates communication with the second communication device using the first communication method.

10. The method according to claim 1, wherein the step of requesting the second communication device status indicator is performed when a user of the first communication device selects the user of the second communication device from a display of users on the first communication device.

11. A The method according to claim 1, wherein, the step of requesting the second communication device status indicator is performed periodically according to a predetermined frequency.

12. The method according to claim 1, wherein the second communication method has a higher required average data transfer rate than the first communication method.

13. A The method according to claim 1, wherein the first communication method is initiated prior to the requesting step.

14. The method according to claim 13, further comprising the steps of:
   receiving a request from the service platform to provide the first communication device status indicator of the ability of the first communication device to communicate using the second communication method, the request including the second communication device status indicator of the ability of the second communication device to communicate using the second communication method;

determining the first communication device status indicator based on the current network connectivity of the first communication device;

forwarding the first communication device status indicator to the service platform; and, allowing the first communication device to communicate with the second communication device using the second communication method in dependence on the first and the second communication device status indicators, wherein the second communication device status indicator depends on the current network connectivity of the second communication device.

15. The method according to claim 1, further comprising the step of detecting a change in network connectivity of the first communication device, where the requesting step is performed when there is a change detected in network connectivity of the first communication device.

16. The method according to claim 15, further comprising the steps of:

receiving a request from the service platform to provide the first communication device status indicator of the ability of the first communication device to communicate using the second communication method, the request including the second communication device indicator of the ability of the second communication device to communicate using the second communication method; determining the first communication device status indicator based on the current network connectivity of the first communication device;

forwarding the first communication device status indicator to the service platform; and allowing the first communication device to communicate with the second communication device using the second communication method in dependence on the first and the second communication device status indicators, wherein the second communication device status indicator depends on the current network connectivity of the second communication device.

17. The method according to claim 1 wherein the network comprises a plurality of different, interconnected communication networks each configured for supporting the first and the second different communication methods.

18. A method of operating a network having a service platform, the network supporting first and second different communication methods, the method comprising the steps of:

receiving a request to register a first communication device on the service platform;

determining the first communication device status indicator of the ability of the first communication device to communicate using the second communication method based on a current network connectivity of the first communication device;

registering the first communication device on the service platform; and, in response to a selection of a user associated with a second communication device from a display of users on the first communication device, receiving a request from the first communication device to provide the second communication device status indicator of the ability of the second communication device to communicate using the second communication method, the request including the first communication device status indicator, wherein at least one of the first and the second communication devices is a mobile telecommunications device; and, wherein, when the second communication device is registered on the service platform, then: routing the request to the second communication device; receiving the second communication device status indicator from the second communication device, the second communication device status indicator depending on the current terminal hardware status, the current terminal hardware status including at least one of a battery life and file storage space of the second communication device, and current network connectivity of the second communication device;

routing the received second communication device status indicator to the first communication device; and allowing the first communication device to communicate with the second communication device using the second communication method in dependence on the first communication device status indicator and the received second communication device status indicator, wherein, when the second communication device is not registered on the service platform, then: providing a negative second communication device status indicator to the first communication device.

19. The method according to claim 18, further comprising the steps of:

registering the second communication device on a service platform of the network;

determining the second communication device status indicator based on the current network connectivity of the second communication device; and, forwarding the second communication device status indicator to the service platform.

20. A first communications device that communicates with a second communication device using a network supporting first and second different communication methods, wherein the first communication device:

allows the first communication device to communicate with the second communication device using the first communication method;

determines the first communication device status indicator of the ability of the first communication device to communicate using the second communication method based on a current network connectivity of the first communication device;

registers the first communication device on a service platform of the network;

in response to a selection of a user associated with the second communication device from a display of users on the first communication device, requests from the service platform the second communication device status indicator of the ability of the second communication device to communicate using the second communication method; the request including the first communication device status indicator;

receives the second communication device status indicator from the service platform; and allows the first communication device to communicate with the second communication device using the second communication method in dependence on the first communication device status indicator and the received the second communication device status indicator, and wherein the second communication device status indicator depends on the current terminal hardware status, the current terminal hardware status including at least one of a battery life and file storage space of the second device, and current network connectivity of the second communication device.

21. A The first communications device according to claim 20, wherein at least one of the first and the second communication devices is a mobile telecommunications device.

22. A communications system comprising communication network supporting first and second different communication methods and a first communication device that communicates with a second communication device using said network, wherein the system:
   allows the first communication device to communicate with the second communication device using the first communication method; determines the first communication device status indicator of the ability of the first communication device to communicate using the second communication method based on a current network connectivity of the first communication device;
   registers the first communication device on a service platform of the network; in response to a selection of a user associated with the second communication device from a display of users on the first communication device, requests from the service platform the second communication device status indicator of the ability of the second communication device to communicate using the second communication method, the request including the first communication device status indicator;
   receives the second communication device status indicator from the service platform; and, allows the first communication device to communicate with the second communication device using the second communication method in dependence on the first communication device status indicator and the received second communication device status indicator, and
   wherein the second communication device status indicator is dependent upon the current terminal hardware status, the current terminal hardware status including at least one of a battery life and file storage space of the second communication device, and current network connectivity of the second communication device.

23. The system as claimed in claim 22, wherein the second communication device status indicator depends on at least one of: (i) communication method capability of the second communication device; (ii) manually input user status information; (iii) automatically generated user status information; (iv) device hardware functionality; (v) device software functionality;
   and (vi) communication method quality of service.

24. The system according to claim 23, wherein at least one of the first and the second communication devices is a mobile telecommunications device.

25. The system as claimed in claim 22, wherein at least one of the first and the second communication devices is a mobile telecommunications device.

26. A service platform of a network, the network supporting first and second different communication methods, wherein the service platform: receives a request to register a first communication device on the service platform;
   determines the first communication device status indicator of the ability of the first communication device to communicate using the second communication method based on a current connectivity of the first communication device; registers the first device on the service platform; and, in response to a selection of a user associated with the second communication device from a display of users on the first communication device, receives a request from the first communication device to provide a second device status indicator of the ability of the second communication device to communicate using the second communication method, the request including the first communication device status indicator,
   wherein, when the second communication device is registered on the service platform, the service platform:
   routes the request to the second communication device; receives the second communication device status indicator from the second communication device, the second communication device status indicator depending on the current terminal hardware status, the current terminal hardware status including at least one of a battery life and file storage space of the second communication device, and current network connectivity of the second communication device;
   routes the received second status indicator to the first communication device; and
   allows the first communication device to communicate with the second communication device using the second communication method in dependence on the first communication device status indicator and the received second communication device status indicator,
   wherein, when the second communication device is not registered on the service platform, the service platform provides a negative second communication device status indicator to the first communication device.

27. The service platform of the network according to claim 26, wherein at least one of the first and the second communication devices is a mobile telecommunications device.

28. A system for facilitating communications between a first and a second communication devices, comprising:
   the first communication device according to claim 20;
   a service platform according to a network, the network supporting first and second different communication methods, wherein the service platform:
   receives a request to register the first communication device on the service platform; registers the first communication device on the service platform; and
   receives a request from the first communication device to provide the second communication device status indicator of the ability of the second communication device to communicate using the second communication method,
   wherein, when the second communication device is registered on the service platform, the service platform:
   routes the request to the second communication device; receives the second communication device status indicator from the second communication device, the second communication device status indicator depending on the current network connectivity of the second communication device; and, routes the received second status indicator to the first communication device,
   wherein, when the second communication device is not registered on the service platform, the service platform provides a negative second communication device status indicator to the first communication device; and the second communication device: registers the second communication device on the service platform of the network;
   receives a request from the service platform to provide the second communication device status indicator of the ability of the second communication device to communicate using the second communication method;
   determines the second communication device status indicator based on the current network connectivity of the second communication device; and
   forwards the second communication device status indicator to the service platform.

29. The system according to claim 26, wherein at least part of the network is wireless.

\* \* \* \* \*